(12) United States Patent
Roberts et al.

(10) Patent No.: US 7,374,655 B2
(45) Date of Patent: May 20, 2008

(54) ELECTROCHEMICAL WATER PURIFIER

(75) Inventors: Gary D. Roberts, Montpelier, ID (US); David W. Roberts, Montpelier, ID (US)

(73) Assignee: Novastron, Montpelier, ID (US)

(*) Notice: Subject to any disclaimer, the term of this patent is extended or adjusted under 35 U.S.C. 154(b) by 391 days.

(21) Appl. No.: 11/032,673

(22) Filed: Jan. 10, 2005

(65) Prior Publication Data

US 2005/0183964 A1    Aug. 25, 2005

Related U.S. Application Data

(60) Provisional application No. 60/536,216, filed on Jan. 12, 2004.

(51) Int. Cl.
*C02F 1/461* (2006.01)

(52) U.S. Cl. ............... 205/701; 205/742; 205/751; 205/761; 204/164; 204/555; 204/267; 204/272; 204/660

(58) Field of Classification Search ............ 205/701, 205/742, 751, 761; 204/164, 555, 267, 272, 204/660
See application file for complete search history.

(56) References Cited

U.S. PATENT DOCUMENTS

| | | | | |
|---|---|---|---|---|
| 3,801,482 A | * | 4/1974 | King | 205/751 |
| 4,149,953 A | * | 4/1979 | Rojo | 204/269 |
| 6,878,268 B2 | * | 4/2005 | Sawada | 210/199 |

* cited by examiner

*Primary Examiner*—Arun S. Phasge
(74) *Attorney, Agent, or Firm*—Bateman IP Law Group

(57) ABSTRACT

An electrolytic water purification system and method use provides a water filtration device with a plurality of electrolytic cells having anodes and cathodes specifically selected to remove contaminants from water. The device is capable of efficiently removing nearly all contaminants from water and is also capable of purifying the water by destroying micro-organisms which are in the water. Many minerals are removed from the purified water, and it is not necessary to add chemicals to the water during or after the purification process.

31 Claims, 15 Drawing Sheets

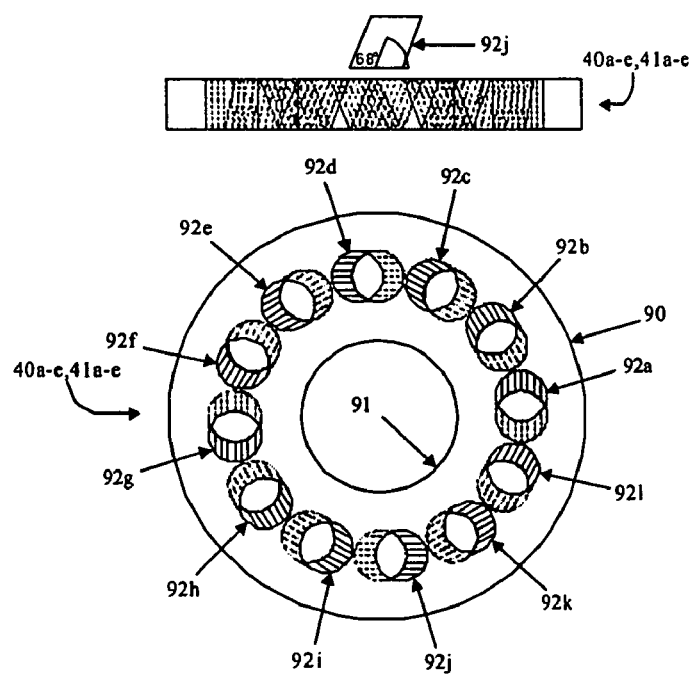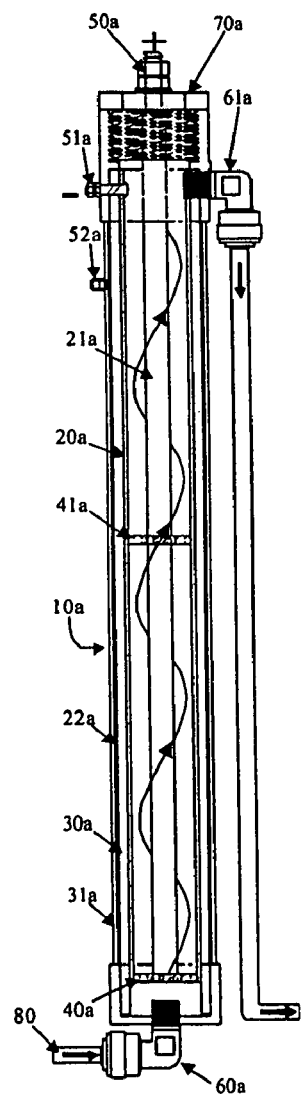
Fig. 5a
Fig. 5b

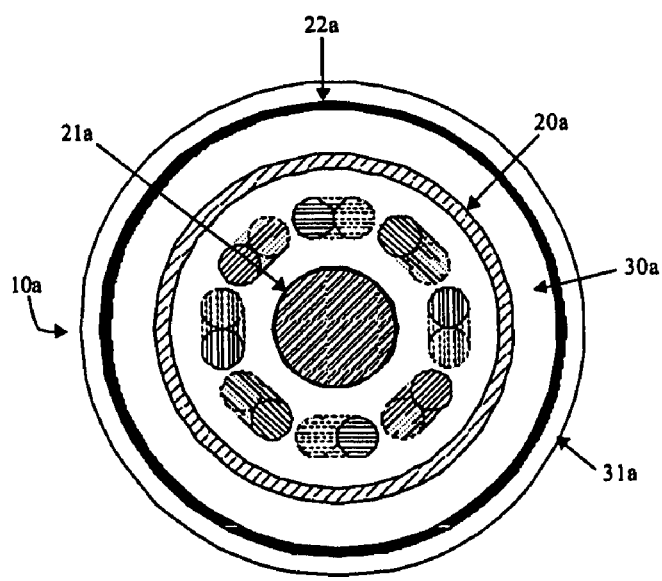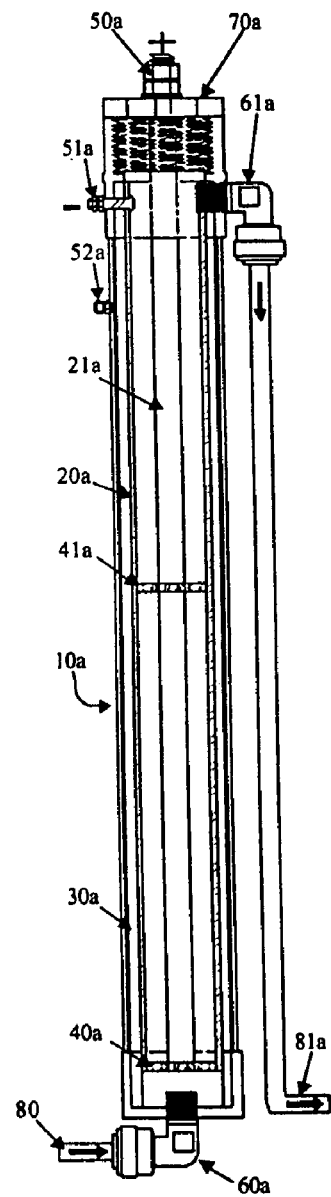
Fig. 7a
Fig. 7b

ELECTROCHEMICAL WATER PURIFIER

RELATED APPLICATIONS

The present application claims the benefit of U.S. Provisional Application No. 60/536,216, Filed on Jan. 12, 2004, which is expressly incorporated herein.

BACKGROUND OF THE INVENTION

1. The Field of the Invention

The present invention relates to an electrochemical water purifier. More particularly, the invention relates to a method and apparatus for the purification of impure water using a conjugated system of electrolytic currents and electrostatic fields.

2. The State of the Art

This invention relates, in general, to a method and apparatus for electrochemically altering contaminants found in aqueous solutions, so as to facilitate their simplified extraction, and thereby provide purified potable water.

The chemical compound $H_2O$ is a very unusual substance with many unique properties that contribute to its life supporting role in nature. Like the air we breathe, water is central to life, and is required in relatively large quantities. Nothing is more familiar to each of us, and yet, most people living in developed countries usually take water and its quality for granted. Generally speaking, unless there is an emergency or shortage wrought by drought or contamination, most people seldom think about where it comes from, what it contains, how pure it is, or how long our supply of it will last. We simply turn on a faucet, and expect a sufficient quantity of clean pure water to come flowing out.

To put things in better perspective, of the total water found on earth, very little is found in a pure enough condition to even be considered as a source for drinking purposes. Our oceans contain 97.4% of all of the water found on earth. Fresh water sources are limited to the polar ice caps, glaciers, above ground bodies of water, and underground aquifers, which together contain only 2.59%. Surprisingly, all of our lakes, rivers, streams, soil, and atmosphere combined only contain a mere 0.014%!

Until a decade or two ago, the term "Bottled Water" was practically unheard. Today, however, as people become more aware of the harmful substances that may be found in municipal or private water supplies, bottled water is big business with annual revenues in the United States towering over four billion dollars. Presently, more than three billion gallons of bottled water are sold each year in the United States and in Europe. Bottled water is now the largest selling "soft drink" in these regions. However, bottled water is very expensive relative to tap water, typically, selling anywhere from $0.50 to $1.00 a quart. This is thousands of times more expensive than tap water. Concern for personal safety, and the possible long term health risks associated with drinking contaminated or polluted water, continues to drive this market in spite of the high cost.

All groundwater, including that fit for drinking, contains dissolved chemical substances. The exact composition of groundwater depends on the original composition of the precipitation before it enters the ground, the nature of the soil that first makes contact with the precipitation, the minerals that make up the rocks in the saturated zone, the Water temperature, and the presence of industrial or other human contaminants. Total dissolved substances in groundwater range from about 20 to more than 300,000 milligrams per liter.

Almost all human activity alters water quality somewhat, but not necessarily as a result of pollution by human materials. For instance, in some areas, reduction of water levels in the subsurface by pumping may allow saline water to flow toward the wells; this occurs most often in coastal areas. Domestic waste (sewage and solid trash), however, is the most serious source of groundwater contamination. Solid trash, if accumulated in large amounts in humid regions, can become a major source of concentrated pollution. Water moving through the decaying trash can dissolve thousands of milligrams per liter of noxious material, including poisonous metals and flammable methane.

Human activity has increasingly polluted our precious sources of fresh water. Today, many of our long held and heavily relied on sources of fresh water have become so polluted that they can no longer be used without considerable health risks or concern. Even though some of the contamination is a result of naturally occurring events, human beings are still the primary perpetrators. For example, pollution from factories, heavy mining operations, industrialized farming practices, concentrated animal rearing and feeding operations, as well as misuse of solvents and other chemically formulated "fix all" products have contaminated the air we breathe and the water we drink. Pollutants include such things as cadmium, chromium, lead, mercury, radionuclides, arsenic, nitrates, phosphates, benzene, trihalomethanes, methyl tertiary butyl ether (MTBE), pathogenic microorganisms, insecticides, and herbicides to name just a few.

Addressing water pollution has become a formidable challenge, and water pollution presents a continued health risk to people all over the earth. Thousands of people each year are being poisoned as a result of drinking contaminated water. Consequently, keeping public water supplies safe has long been recognized as an important public health issue by all developed countries.

In 1974, the U.S. Congress passed the Safe Drinking Water Act (SDWA) in response to public concern about findings of harmful substances in drinking water supplies. Contaminants that may pose health risks are regulated by the EPA, as required by the SDWA, as amended in 1996. For example, the EPA recently lowered its standard for arsenic from 50 µg/L to 10 µg/L. Higher concentrations have proven to have a profound effect on the risk of developing cancer. There are now more than 80 EPA regulated contaminants for water quality. Prudence dictates that we continue to take all of the necessary steps to protect the earth's life sustaining waters from contamination, and provide a means whereby people throughout the world may have access to an abundance of clean, pure, economically derived water.

In addition to removing pollutants, an important consideration regarding the art of purifying contaminated water is that of removing excessive amounts of calcium, magnesium, and iron as these minerals can lead to a condition known as hardness. Hard water interferes with almost every cleaning task from laundering and dishwashing to bathing and personal grooming. Clothes laundered in hard water often look dingy and feel harsh and scratchy. Dishes and glasses may be spotted when dry. Hard water may cause a film on glass shower doors, shower walls, bathtubs, sinks, faucets, windows etc. Hair washed in hard water may feel sticky and look dull. Hard water deposits in pipes may also reduce water flow.

The amount of hard minerals in water affects the amount of soap and detergent necessary for cleaning. Soap used in hard water combines with the minerals in water to form a sticky soap curd. Some synthetic detergents are less effective in hard water because the active ingredients are partially inactivated by hardness, even though they remain dissolved. Bathing with soap in hard water leaves a film of sticky soap curd on the skin. The film may prevent removal of soil and bacteria. Soap curd interferes with the return of skin to its normal, slightly acidic condition, and may lead to irritation. Soap curd on hair may make it dull, lifeless and difficult to manage. When doing laundry in hard water, soap curds lodge in fabric during washing to make the fabric stiff and rough. In addition, concentrations of iron in the water greater than 0.3 mg/L can also cause staining of laundered clothes, dishes etc. Incomplete soil removal from laundry causes graying of white fabric and the loss of brightness in colors. A sour odor can also develop in clothes due to incomplete removal of contaminants. Continuous laundering in hard water can shorten the life of clothes.

Hard water also contributes to inefficient and costly operation of water using appliances. Heated hard water forms a scale of calcium and magnesium minerals that can contribute to the inefficient operation or failure of water using appliances. Pipes can become clogged with scale that reduces water flow and ultimately requires replacement. Hard water and the subsequent requirement of additional body, laundry and dish soaps, the use of chemical additives and softening agents also adds to the increased treatment and eventual pollution of our underground aquifers and fresh water sources.

Present water purifying and conditioning systems, however, are very lacking in their ability to effectively and efficiently remedy many of the afore mentioned contaminations. Distillation, for example, is simply too costly to even be considered as a mainstay solution.

Reverse osmosis systems not only waste a lot of water in the process of keeping the RO membrane clean and operable, but changes in water temperature passing through the membrane influences the membrane's ability to filter out certain, unwanted, contaminants such as arsenic. The RO process is also expensive to operate and maintain due to the high pressure required for its operation, and the frequently required replacement of costly filters and membranes Ozonation is effective in the removal of some of the heavy metals, as well as fractions that are of organic origin, but it is also very expensive to operate, and it will not remove many of the hazardous contaminants mentioned earlier such as arsenic and phosphorous.

Granulated, activated charcoal (GAC) systems will only remove narrow portions of the typical aqueous contaminations such as certain odor causing fractions, fractions of organic origin, and some of the chlorine and chemical contaminants. However, its removal efficiency rapidly diminishes over time requiring frequent replacement, and it will not remove many of the toxic or hazardous contaminants.

Ion exchange resin systems remove only a fraction of the contaminants mentioned above. They are used primarily to "soften" the water by removing calcium and magnesium ions, which pose absolutely no health risks, in exchange for sodium at the rate of about 8 mg/liter for each grain of hardness removed per gallon of water. Scientific research has shown that water treated in this fashion releases enough sodium to aggravate, or lead to, cardiovascular disorders. The state of California recently passed legislation outlawing any new installations of such due to the high levels of salt discharge into the sewerage systems which are required to regenerate their effectiveness. Furthermore, the removal of many contaminants, such as iron, via ion exchange technology requires the use of very harsh chemicals such as potassium permanganate in order to regenerate. Such chemicals only exacerbate the escalating problem of ground water contamination, as they may be discharged, unaffected, from present art wastewater treatment facilities.

Electro coagulation systems are somewhat effective in the removal of many of the EPA regulated contaminants; however, they do not meet all of the necessary drinking water standards. Moreover, electro coagulation systems do not provide a means to electrochemically recover virtually all of the excess anodally liberated ions, metallic oxides or colloids. Failure to remove these adscititious elements may introduce serious environmental concerns and health hazards. For example, high concentrations of aluminum in aqueous solutions will kill or injure a wide variety of plant and animal life, including fish. Consequently, all prior art systems require additional filtration through zeolites and/or secondary ion exchange systems to achieve potability. These ancillary filtration devices must be either replaced or regenerated using chemical additives so the use of such may be considered irresponsible.

Some prior art devices claim pathogenic reductions following the treatment of contaminated sources, but the mechanisms employed to accomplish this objective, namely, fragmentary ozonation at the anode surface as stated in U.S. Pat. No. 4,872,959, direct electric current as in U.S. Pat. No. 5,091,152, or areas of high temperature as in U.S. Pat. No. 5,271,814, do not comprise an efficient, universal, or a certifiably complete means to achieve axenic sterilization.

Moreover, as in U.S. Pat. Nos. 4,293,400, 4,378,276 and 4,872,959, integral obstructions fixed between an anode/cathode pair, such as a helical wrap, may be somewhat effective as a spacing member, or even as a means to manipulate the retention time of the solution being treated. However, because a significant percentage of the effective surface area of both the anode and cathode is occluded, an electrolytic cell of this design must be increased in length proportionate to the total square area of the obstruction in order to retain relative efficiencies resulting in higher manufacturing costs and maintenance expenses. This problem is exacerbated anytime the effective surface area of an anode/cathode pair is rendered inefficacious by use of an anode having a greater effective surface area than its corresponding cathode, as in U.S. Pat. Nos. 4,293,400, 4,378,276 and 4,872,959, or whenever abrupt, non uniform, current densities exist along any electrode surface as in U.S. Pat. Nos. 5,043,050, 5,271,814, and 5,423,962.

Furthermore, the absolute majority of electrolytic prior art systems and technologies emphasize a means for routinely operating a described apparatus in a reverse polarized condition to facilitate a cleansing of the anode/cathode surfaces employed. While there are some short term benefits derived from this technique, reversing polarity over extended periods of time will eventually pacify both electrodes, rendering them non conductive and ineffective. Additional complications arise if the anode and cathode of an electrolytic device are composed of dissimilar materials. By way of example, U.S. Pat. No. 4,872,959 describes an apparatus, which principally utilizes iron and aluminum as anodes and cathodes. Therefore, while operating this device in one direction of polarity, high concentrations of ionic or colloidal aluminum will be discharged with the treated solution, and while operating in a reverse polarized condition the adscititious contaminant will be high concentrations of ionic or colloidal iron. The oscillating nature of the excess anodally liberated metal oxides introduced by such prior art electrolytic devices pose complicated environmental and human health considerations.

No prior art electro coagulation system or technology is capable of electrochemically extracting both non electrolytes and electrolytes from solution. Non electrolytes are, by definition, non ionic, non conductive compounds that remain unaffected by electrolytic influences and/or processes. These contaminating fractions can only be electrochemically influenced following adequate exposure to high voltage, ionizing, electrostatic fields of sufficient intensity to transform these compounds into ionic, conductive, species that may then be extracted from solution by means of precipitating electrochemical reactions, or via electrostatic filtration systems or technologies. Although some prior art systems and technologies utilize electrostatic fields, while others employ electrolytic currents, no prior art system or technology provides a means for the incorporation of both of these complementary electromotive forces within a conjugated treatment cell. Consequently, these apparatus may remove only a portion of the full spectrum of contaminants.

With the foregoing background of the invention in mind, and as the following description of the invention proceeds, it is desirable to provide an improved system for the concerted electrostatic and electrolytic, and/or uncompounded electrolytic, treatment of aqueous solutions which is free of the aforementioned and other such disadvantages of the prior art configurations. The system should provide clean, safe, softened, pathogen free, inexpensive, pH balanced, potable water without the use or necessity of secondary purification systems or technologies such as absorption filters, ion exchange systems, or zeolites, etc. It should be understood, however, that conjunctive use of such secondary filtration technologies might not in every instance be proscribed and is within the scope of the present invention.

It is further desirable to provide an improved system for the efficient and effective extraction, or safe level reduction, of all EPA regulated or non regulated, metal or non metal, contaminants encountered within aqueous fractions with very few possible exceptions by means of concerted electrostatic ionic separations and precipitating electrochemical reactions, and/or fundamental precipitating electrochemical reactions, without the use of salt brine solutions or the addition of harsh chemicals.

It is yet further desirable to provide an improved system for the efficient and effective softening of aqueous solutions by means of concerted electrostatic ionic separations and precipitating electrochemical reactions, and/or fundamental precipitating electrochemical reactions, without the use of salt brine solutions or the addition of harsh chemicals.

It is yet further desirable to provide an improved system for the efficient and effective extraction of virtually all autochthonous contaminants, as well as excess anodally liberated adscititious metal ions. These may be either electroplated or precipitated out of solution by means of sequentially complementary anode/cathode pairs (treatment cells) having maximized efficiencies, efficacies, concentrically uniform field/current densities, particularized redox potentials, and specific solution pH altering capacities, inherent in the structure and composition of the invention.

It is yet further desirable to provide an improved system for the efficient and effective maximization of solution retentivity and homogeneity. Optimally, aqueous solutions traversing a treatment cell shall be constrained to move as an upward vortical flow by means of one or more low profile, disk shaped, non conductive, electrode spacing members further engineered to induce a directionally specific vortical acceleration upon fractions passing through its plurality of equidistant, homocentrically arrayed, and biased orifices.

It is yet further desirable to provide an improved system for the efficient and effective maximization of solution retentivity and homogeneity, wherein, electrode surfaces shall be smooth, or gently undulated and helically oriented, so as to respectively facilitate an unimpeded or augmented vortical flow within a treatment cell; thereby, rectifying undesirable upward convective currents induced upon the solution by electrode off gassing.

It is yet further desirable to provide an improved system for the efficient and effective maximization of anode/cathode efficiency and efficacy by using treatment cells which are unimpeded by lengthy integral obstructions fixed between an anode/cathode pair, such as a helical wrap. The use of relatively unobstructed anode/cathode pairs facilitates net reductions in cell length and diameter as well as inherent reductions in manufacturing and maintenance expenses.

It is yet further desirable to provide an improved system for the efficient and effective maximization of anode/cathode efficiency and efficacy, wherein, the effective surface area of any given cathode shall be greater than or equal to the effective surface area of its corresponding anode. Having a cathode with greater surface area than the corresponding anode helps offset any pacification resulting from accumulating non conductive gasses and/or oxides on either electrode surface as well as changes in electrode diameter due to sacrificial consumption, or enlargement due to electroplating.

It is yet further desirable to provide an improved system for the efficient and effective maximization of anode/cathode efficiency and efficacy, wherein, electrolytic and concerted electrostatic current/field densities are made concentrically uniform. This has been determined to be an exceedingly important factor during the purification process as well as increasing longevity, and maintaining continued successful operation.

It is yet further desirable to provide an improved system for the efficient, effective, and universal sterilization of pathogenic microorganisms by means of synergistic anode/cathode (treatment cell) arrangements, embedded within a treatment cell array, and which possess inherent germicidal properties such as with a copper/aluminum anode/cathode pair.

It is yet further desirable to provide an improved system for offsetting the operational cost of the apparatus by providing a means to efficiently and effectively claim, and/or recycle, all such elements as may have electroplated out of solution on cathode surfaces.

It is yet further desirable to provide an improved system for offsetting the operational cost of the apparatus by providing a means to harvest the chemically diverse precipitates, and/or soluble ionic compounds.

It is yet further desirable to provide an improved system for offsetting the operational cost of the apparatus by providing a means to efficiently and effectively collect, purify, and store the hydrogen gas which is liberated during treatment and which may then be used as a recoverable source of energy. For example, purified hydrogen could be ported from a storage system or technology to a fuel cell, combustion generator, etc., where it would be spent to produce electric power. This reclaimed energy could then be subsequently cached in a battery, super capacitor, etc., or immediately applied to subsidize the operational energy requirements of the present invention, or for use in other devices or purposes. Alternatively, the purified hydrogen gas could be harvested for later use.

It is yet further desirable to yield a variety of embodiments, adaptable and suited to the constituents of the aqueous solution to be purified, so as to accommodate a diversity of two or more sequentially complementary anode/cathode pairs (forming a treatment array), and which are comprised of any combination or species of conductive, efficacious, metal and/or non metal material.

It is yet further desirable to accommodate the automatic application of DC bias voltages sufficient to neutralize the redox potentials of any given anode/cathode pair comprising a natural electrolytic cell, of either direction, after operating voltages are disengaged. These retaining voltages shall, accordingly, be discontinued when normal operation of the apparatus resumes.

It is yet further desirable to facilitate a means for periodic, short term, reverse polarization of electrodes which may be at times requisite to revitalize the efficiency and efficacy of certain anode/cathode pairs that may be employed within an array.

It is yet further desirable to accommodate the automatic evacuation of the aqueous solution contained within predetermined treatment cells to a sewer or wastewater treatment system after operating voltages are disengaged.

It is yet further desirable to accommodate the automatic evacuation of the solution contained within predetermined treatment cells to a sewer or wastewater treatment system following a reverse polarization of electrodes which may be periodically requisite to revitalize the efficiency and efficacy of certain anode/cathode pairs that may be employed within an array. It should also be noted that normal operation of the apparatus during such a cleaning cycle may be electively suspended. It will be further appreciated, however, that implementation of these procedures shall not be required in all cases, and should be employed sparingly.

It is yet further desirable to provide a means whereby the aforesaid evacuated solution may be electively replaced with $CO_2$, or any other efficacious, non hazardous, environmentally safe compound, which may serve to prevent or remove non conductive film accumulation upon electrode surfaces. Aforesaid revitalizing compounds would, in turn, be harmlessly discharged to a sewer, wastewater treatment system, or holding tank before normal operation of the apparatus resumed.

It is yet further desirable to yield a variety of embodiments, adaptable and suited to the constituents of the aqueous solution to be purified, so as to accommodate the conjunctive use of pH altering systems and technologies, preceding and/or following the usage of any given treatment cell, including, but not limited to, $CO_2$ infusion systems designed to produce carbonic acid, subsequently lower the pH of the processed solution, and further induce some dissolved contaminants to form precipitates that may then be easily extracted.

It is yet further desirable to yield a variety of embodiments, adaptable and suited to the constituents of the aqueous solution to be purified, so as to accommodate individual treatment cells, within the array, being energized by either concerted high voltage DC electrostatic fields and low voltage DC electrolytic currents, or uncompounded DC electrolytic currents, in order to efficiently and effectively extract non electrolytic, electrolytic, and colloidal contaminants from solution by means of specifically tailored electrochemical reactions.

It is yet further desirable to yield a variety of embodiments, adaptable and suited to the constituents of the aqueous solution to be purified, so as to facilitate an assortment of collection points, or means, in order to efficiently and effectively harvest the chemically diverse precipitates, and/or soluble ionic species such as nitrates, nitrites, salts, etc.

It is yet further desirable to provide a filtration system with a relatively long life span.

It is yet further desirable to consume a minimal amount of energy while operating the invention described herein.

It is, yet further desirable to provide filtration system which may be constructed in a variety of sizes that may satisfy the need of a single individual, a small home or dwelling, or a large scale municipal water treatment facility.

It is yet further desirable to provide a variety of embodiments, adaptable and suited to the volumetric amount of aqueous solution to be treated, so as to efficiently and effectively dispense purified water by means of a reservoir tank, a pressure tank, or on demand, etc., as circumstance may prescribe.

It is yet further desirable to provide a relatively compact sized water treatment system. The water treatment system is thus more useful as it may be used in residential and smaller commercial applications.

It is yet further desirable to facilitate the optional use of automatic controls to reduce the necessity of human intercession in the operation of the invention.

It is yet further desirable to provide a filtration system which has reduced maintenance requirements, operational expenses, and manufacturing costs. The filtration is thus less expensive to purchase and operate, making the filtration system more available to individuals in need of such a filtration system.

SUMMARY OF THE INVENTION

The present invention provides purified potable water without the use or necessity of secondary purification systems or technologies, and without the use of salt brine solutions or the addition of harsh chemicals.

The above and other aspects of the invention are realized by providing a novel process and method wherein a series of complimentary electrochemical treatment cells are selectively chosen, arrayed, and coupled via nonconductive conduits. Each cell of the prescribed series is provided with a uniform, concentrically polarized, and predetermined electrostatic field with a conjoined electrolytic current via electrically nonconductive, circumferential, tubular bodies.

The selection of the cellular arrangement is based primarily upon the nature of the aqueous solution being treated, such as its pH, the quantity of undesirable contaminating fractions to be removed, and their respective chemical reactivities or tendency to undergo specific redox reactions. Each treatment cell of the prescribed arrangement comprises an anode/cathode pair that facilitates prescribed chemical reactions within the cell, thereby allowing undesirable aqueous fractions to chemically combine or agglomerate into environmentally stable precipitates. If an aqueous solution to be treated is known to contain harmful pathogenic organisms, specific anodal elements can be chosen for one or more of the staged treatment cells to provide sterilization capabilities.

According to one embodiment of the present invention, the aqueous solute flowing through each of the sequentially complimentary treatments cells is vertically accelerated without the use of a helical wrap. Furthermore, selective removal of specific precipitates or soluble ionic fractions may be selectively removed at various stages of the treatment process. Moreover, the present invention may have reduced overall operational costs via the collection, purification, and utilization of hydrogen gasses which are produced during the treatment process. Furthermore, the operational energy requirements of the apparatus may be supplied or subsidized by alternative energy systems or technologies such as hydrogen fuel cells, solar energy, wind energy, etc.

The present invention provides a more effective, efficient, and comprehensive method for utilizing an electromotive force to interact with contaminants encountered within aqueous solutions, and to electrochemically facilitate their simplified extraction, while concurrently extracting excess adscititious metal ions oxidized into solution during the course of treatment.

BRIEF DESCRIPTION OF THE DRAWINGS

Various embodiments of the invention will now be discussed in reference to numbered drawings so as to enable one of skill in the art to practice the present invention wherein:

FIG. 5a shows a plan view and an elevation view of a specifically engineered, non conductive, electrode spacing vortical flow inducing member having an axis of rotation angle equal to approximately 68 degrees so as to induce a directionally specific vortical acceleration upon fractions passing through its plurality of equidistant, homocentrically arrayed, biased orifices, in accordance with the objects and design criteria of the present invention;

FIG. 5b is a side elevation, longitudinal cross section of an electrochemical cell, designed in accordance with the design criteria of the present invention, illustrating the effect the member shown in FIG. 5a would have upon the solution passing through its homocentric biased orifices;

FIG. 7a depicts a cross sectional view, taken at 40a and 41a of FIG. 7b, and further illustrates the functional relationship of the non conductive, electrode spacing vortical flow inducing members with respect to the anodes and cathodes of each electrochemical treatment cell, utilized by the present invention, emphasizing its electrode spacing capabilities;

FIG. 7b is a side elevation, longitudinal cross section of an electrochemical cell designed in accordance with the design criteria of the present invention;

It will be appreciated that the drawings and descriptions thereof are exemplary of various aspects of the invention, and are not limiting of the scope of the invention which is defined by the appended claims. Many modifications may be made to the invention which are within the scope of the claims.

DETAILED DESCRIPTION OF THE INVENTION

The present invention is characterized by selectively tailored and particularized combinations of sequentially complimentary treatment cells, forming a treatment cell array, designed to electrochemically remove extraneous pollutants from aqueous solutions and thereby render sublimated or otherwise purified potable water from contaminated or questionable sources. Each cell may vary in composition, size, number, and length appropriate to the qualities and constituents of the various aqueous solutions to be purified. Furthermore, all such embodiments shall be constructed or arrayed so as to efficaciously extract adscititious metal ions oxidized into solution during the course of treatment.

Embodiments of the present invention may also be fashioned to incorporate a concerted electrostatic field employed for the purpose of ionizing non electrolyte contaminating species so as to facilitate their extraction. Said invention including parts, steps, sequences, and processes which shall more fully be made to appear in the course of the following descriptions; the drawings merely present and the descriptions merely describe preferred embodiments of the present invention by way of illustration or example, and in no way are meant to be circumscribing as to the actual embodiments which may be needed for a particular situation, operation, or application.

Figure 1:
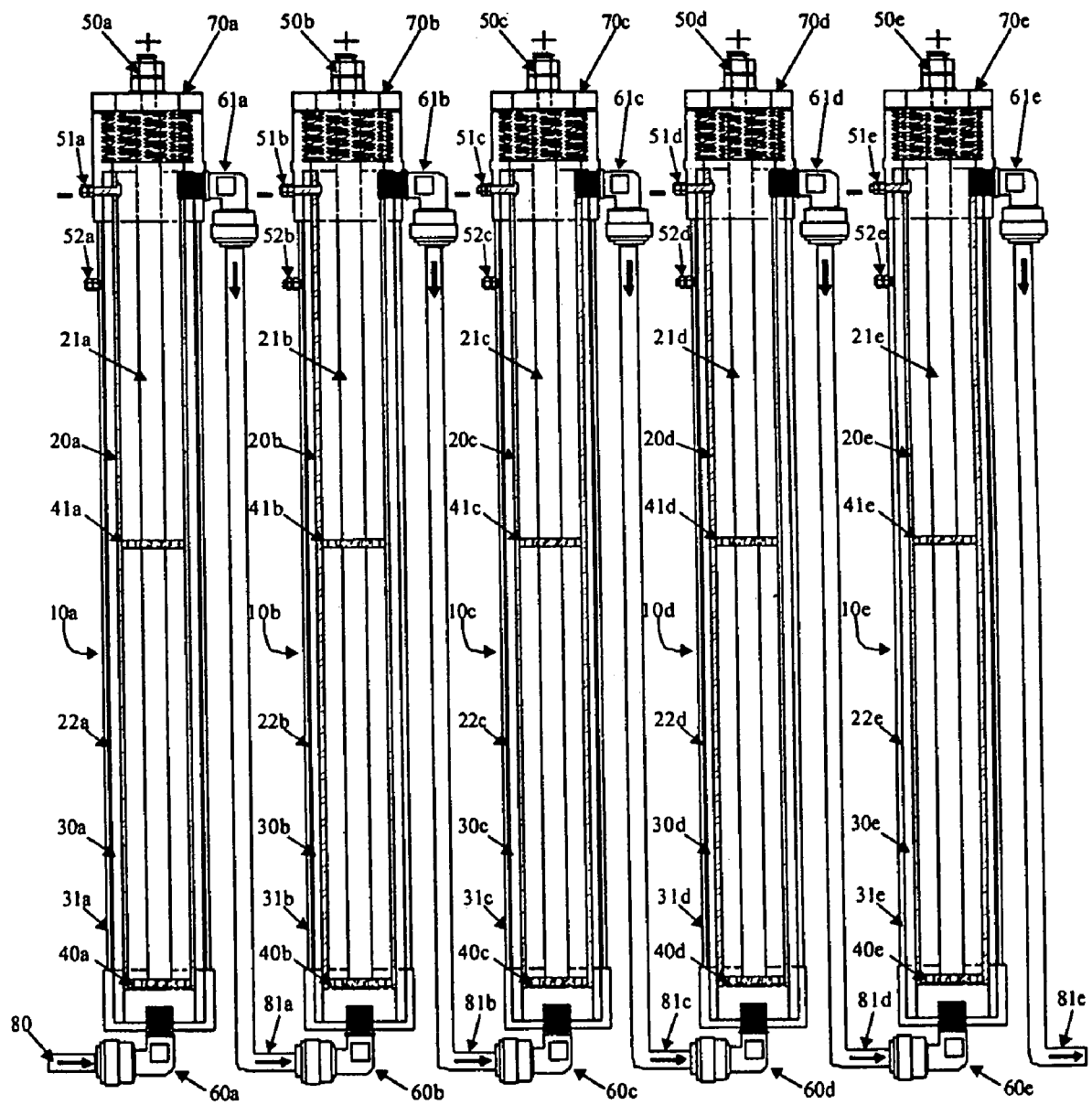
FIG. 1 is a side elevation, longitudinal cross section, illustrating an example embodiment of a particularized sequential series of electrochemical treatment cells in accordance with the objects and design centralities of the present invention.

An example of a preferred embodiment satisfying the objectives of the present invention can be seen by directing attention to FIG. 1 which shows a series of five treatment cells 10a-e of equal size and length. The treatment cells contain a systematic series of specifically tailored and sequentially complementary cathode/anode pairs 20a/21a-20e/21e. Spontaneous oxidation and reduction reactions naturally occur on the cathode/anode pairs, and non spontaneous oxidation and reduction reactions, having a positive value of delta G, can be constrained to occur by performing work on the aqueous solution by connecting the cathode and anode to an external energy source of low voltage DC electric power. When necessary, the treatment cell may be used in combination with a conjunctive high voltage DC electrostatic field, thereby electrochemically transforming undesirable chemical species within the aqueous solution being purified to environmentally friendly precipitates. The precipitates can be removed from the aqueous solution at various stages during the treatment process, or under certain conditions can simply be removed upon exiting the final treatment cell. The particular stage or phase of the treatment process in which it may be desirous to remove specific precipitating fractions via filtration, or other means, is based upon factors such as the solubility and stability of the particular electrochemical fractions being precipitated from solution in each of the various electrolytic cells, the economic or commercial values of said precipitates, and the solution pH at each of the various treatment cells.

Taking into account the variant concentrations and diversities of contaminating fractions encountered within aqueous solutions to be purified, it has been determined, and will become apparent during the course of the following description, that the anode(s) of the initial or primary treatment cell(s) be composed of selective metallic elements. These metals should have a propensity to readily ionize into the aqueous solution, an ample quantity of electropositive ions having an inherent capacity to electrochemically combine with a profusion of contaminating fractions. Additionally, the metals should simultaneously withstand the tendency to become pacified in the process. Hence, anode electrodes 21a-e, of FIG. 1, being sacrificial in nature and requiring occasional replacement, are incorporated in the present invention within nonconductive threaded bodies 70a-e wherein they may be easily replaced.

Entire treatment cells or arrays may be, replaced when expended, and their various component materials and electroplated metals may be either harvested for various commercial uses, or they may be simply broken down and recycled. Furthermore, it will be appreciated that a corresponding cathode should be accordingly chosen or tailored to facilitate all requisite reduction reactions while simultaneously withstanding the tendency to become coated with the various catalyzed chemical fractions.

The primary utility of a subsequent treatment cell(s) within a treatment array of the present invention is to expedite the removal of the excess anodically liberated adscititious elements, utilized by preceding treatment cell(s), to promote specific, precipitating electrochemical reactions. Removal may occur by electroplating any such elements onto a complimentary cathode surface. Subsequent treatment cells should also perform synergistic, complimentary, electrochemical reactions of their own such as biochemical pathogenic sterilizations, pH adjustments, etc. A terminal treatment cell implements a special anode composed of electro conductive material(s) that do not electrolyze additional metallic ions or colloids into the aqueous solution, but continue to support the refinement process by removing adscititious metallic ions of prior cell(s) by way of complementing redox reactions as well as removing any amphoteric contaminating solute fractions via pH adjustments, etc.

Therefore, in looking more particularly at FIG. 1, water to be to be cleaned, demineralized, and purified for potability, or for other uses, is channeled through the plurality of sequentially complementary, vertically oriented, treatment cells 10a-e. The aqueous solution enters the bottom of the first treatment cell 10a by way of nonconductive tubular conduit 80 and nonconductive tubular fitting 60a. Subsequently, the solution is dispersed or circularized helically upward between cathode 20a and anode 21a via low profile, disk shaped, non conductive, electrode spacing, vortical flow inducing elements 40a and 41a.

The example embodiment utilizes smooth faced electrodes; however, gently undulated and helically oriented surfaces may be employed within one or more of the treatment cells to augment the vortical flow functions described previously. The partially treated solution then exits cell 10a by way of nonconductive tubular fitting 61a and nonconductive tubular conduit 81a. At this stage or phase in the treatment process the partially processed aqueous solution may either be ported directly into the next treatment cell 10b, as shown in FIG. 1, or as mentioned above, it may first be channeled through a de gasifying and/or precipitate removal arrangement, which will more fully appear in the course of the following description.

Congruently, the aqueous solution passes through each of the successive phases of the treatment process, entering the second treatment cell 10b by way of nonconductive tubular fitting 60b, being dispersed helically upward between cathode 20b and anode 21b via electrode spacing vortical flow induction elements 40b and 41b, exiting lob by way of nonconductive tubular fitting 61b and nonconductive tubular conduit 81b, entering the third treatment cell 10c by way of nonconductive tubular fitting 60c, being dispersed helically upward between cathode 20c and anode 21c via electrode spacing vortical flow induction elements 40c and 41c, exiting 10c by way of nonconductive tubular fitting 61c and nonconductive tubular conduit 81c, entering the fourth treatment cell 10d by way of nonconductive tubular fitting 60d, being dispersed helically upward between cathode 20d and anode 21d via electrode spacing vortical flow induction elements 40d and 41d, exiting 10d by way of nonconductive tubular fitting 61d and nonconductive tubular conduit 81d, and finally entering the fifth treatment cell 10e by way of nonconductive tubular fitting 60e, being dispersed helically upward between cathode 20e and anode 21a via electrode spacing vortical flow induction elements 40e and 41e, and exiting 10e by way of nonconductive tubular fitting 61a and nonconductive tubular conduit 81e.

Upon exiting cell 10e, the fully processed solution is now channeled into a de gasifying and, precipitate removal arrangement, wherein any remaining gasses are separated from the aqueous solution for purification and storage, or simply jettisoned to the atmosphere in applications too small to be considered cost effective to do so. All remaining precipitates, not filtered or removed in prior stages, are removed from solution through filtration, or other means, leaving purified potable water.

Elaborating more fully now upon the electrochemical treatment processes of FIG. 1, the reaction that occurs at the anodes, or positive electrodes of each cell 21a-e, is always an oxidation reaction in which the chemical species lose electrons, whereas the reaction that takes place at the cathodes 20a-e, or negative electrodes of each cell, is always a reduction reaction in which the active species gain electrons.

As is well known, oxidation and reduction are complementary chemical processes and as such, both processes must occur simultaneously and in equivalent amounts. Thus, the net chemical reaction of each cell, 10a-e, is equal to the sum of the two half cell reactions that occur at the electrodes of each uniquely tailored cellular series.

The ability of the present invention to utilize electrochemical oxidation reduction to remove unwanted chemical elements from aqueous solutions resides in the fact that when certain mineral contaminants are dissolved in water, negative and positive ions are formed. Ions are atoms or molecules bearing an electric charge as a result of having a number of negative electrons unequal to the number of positive protons in their nuclei. An atom or radical that has lost one or more electrons incurs a net positive charge and is referred to as a cation. A cation will migrate to the cathode element of an electrolytic cell. Conversely, an atom, group, or molecule that has taken on one or more additional electrons exhibits a collective negative charge, is referred to as an anion, and is attracted to an anode of an electrolytic cell.

It is important to note here that ions may exist as single, double, triple, and even higher positively or negatively charged atoms. Simple ions consist of a charged atom; complex ions are charged species having a central atom that bears one or more rigidly attached atoms or groups; zwitterions contain attached pairs of groups bearing opposite charges; and polyelectrolytes are large molecules with many charged groups, all of which may coexist in the same aqueous solution.

There are several ways for ionization to occur in a solution. Two natural or common ways are by the splitting of a neutral molecule into a pair of oppositely charged ions, or it may also arise through the transfer of a charged atom between two neutral molecules. These processes routinely occur spontaneously, especially, in the presence of an ion stabilizing solvent such as water. This is one of the principal reasons water becomes contaminated upon encountering various potential solutes.

There are, however, a certain number of mineral constituents that can dissolve, or otherwise become suspended in aqueous solutions that do not form ions. Consequently, these electroneutral contaminants are not easily removed electrolytically since they are non current bearing, or in other words do not give rise to the requisite electrolytic currents required for electrochemical oxidation and reduction reactions via cathodes 20a-e and anodes, 21a-e. These particular contaminants are termed non electrolytes, in that all their electrons are bound tightly in individual atoms, and therefore do not permit the transfer of an electric charge unless artificially induced to do so via a high energy electrostatic field of sufficient intensity to constrain or coerce the removal or addition of one or more electrons.

The treatment cells 10a-e of the present invention may be constructed so as to have such an electrostatic field. The electro static field may generated within the cell using the anode 21a-e and a separate electrically conductive element 22a-e. In the present cells, the electrostatic element 22a-e is a metal cylinder which is placed inside of the outer wall of the cell and outside of the cathode. The electrostatic element is electrically insulated from the solution within the treatment cell by a thin layer of plastic, polymer, resin, etc. to prevent current flow through the solution or electron transfer to the molecules within the solution.

Typically a high voltage, such as 20,000 to 40,000 volts D.C. is applied to the electrostatic element. It will be appreciated that a variety of voltages may be used including 5,000 volts, 10,000 volts, 50,000 volts, etc. What is important is that the voltage is sufficiently high to ionize or otherwise break down the non-ionic compounds. This voltage is sufficient to make the electrostatic field effective in ionizing non-ionic molecules within the solution. The electrostatic field is strong enough to permanently ionize molecules or break molecules into smaller ionic molecules, as compared to a weaker field which may simply induce a temporary dipole moment in the molecule and attract the molecule to the field. The permanently ionized molecules are now electrically conductive, and are subject to the oxidation and reduction reactions which are causing the precipitation of pollutants from the solution.

It will be appreciated that the electrostatic field may be formed as part of one or more treatment cells or may be formed as a completely separate treatment cell. If the electromagnetic field is formed as part of an electrolytic treatment cell, it may be in the same part of the cell, such as surrounding the cathode and anode as is shown, or it may be in a separate end of the treatment cell apart from the anode and cathode.

It will also be appreciated that neither the electrostatic field nor the anode and cathode pairs need be formed in the annular arrangement shown. These elements may also be formed as parallel plates, or in many other shapes as is desired. As discussed, the annular arrangement shown is advantageous as it provides a more uniform field, promotes more even wear and usage of the anode and cathode, and provides uniform flow of the solution through the treatment cell.

And thus, as disclosed above, the ancillary, concentrically polarized, concerted, high intensity, electrostatic field, facilitated by the present invention, provides an innovative means for the removal of a preponderance of contaminants from an aqueous solution that otherwise could not be achieved via standard electrolytic cellular action; thereby, compelling these otherwise neutral elements to form ions, or molecular ionic compounds, which subsequently conform to the electrochemical oxidation reduction regimen wherein they too may be removed from solution via redox reactions employed by the present invention. The operation and configuration of which will become more apparent over the course of the continuing description.

Figure 2A:
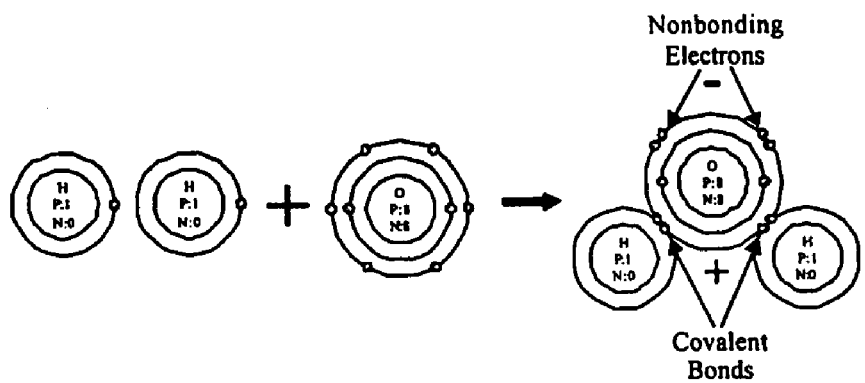
FIG. 2a is a schematic illustrating the polar covalent bonding of a water molecule water molecule, at an atomic level, providing further insight to the operational chemistry of the present invention.

To better understand the electron transport mechanism of water, and its conjoined activity with ionized aqueous matter of the present invention, refer briefly to FIG. 2a. In FIG. 2a you will note that an oxygen atom has a total of six valence electrons in its outer energy shell in comparison to that of the two hydrogen atoms having only one valence electron each. Thus, when an $H_2O$ molecule is formed by the combination of these atoms, the oxygen atom ends up in the center of a bent molecule, being attached by covalent bonds to the two hydrogen atoms, and as such becomes a covalent compound. As may be seen in FIG. 2a, each of the O—H bonds consists of one pair of electrons being shared jointly between the hydrogen and oxygen atoms.

Since oxygen has a higher electronegativity (the measure of an atom's attraction for the electrons it shares in a covalent bond), than does the two hydrogen atoms, the oxygen atom attracts the shared electron pair more strongly than do the two hydrogen atoms. This unequal sharing gives the oxygen end of the $H_2O$ bond a partial negative charge, as depicted in FIG. 2a by a (−) sign. Conversely, the hydrogen end of the molecule has a positive charge, and is thus depicted by a (+) sign. Since this type of bond produces oppositely charged ends or poles, it is referred to as a polar covalent bond.

Figure 2B:
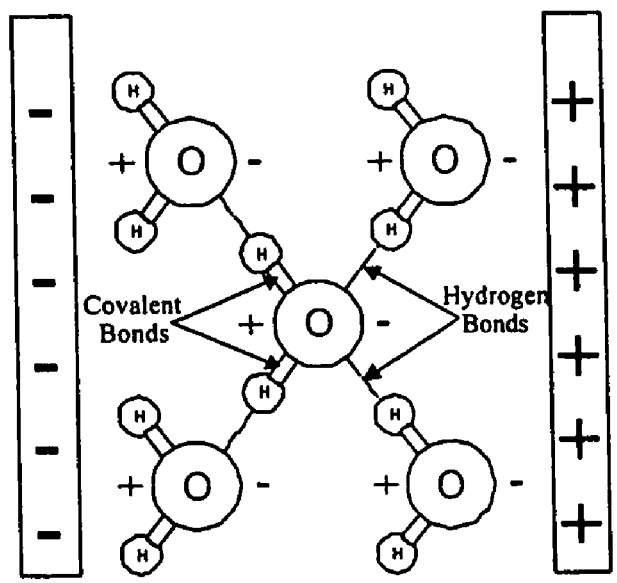
FIG. 2b is a schematic representation of the hydrogen bonds of a single water molecule to four adjacent water molecules, and their respective polar orientation and alignment, under the influence of the direct current electric fields applied to treatment cells of the present invention.

The remaining two non bonding electron pairs of the oxygen atom form a loose, long distance kind of attraction (referred to as a hydrogen bond) to a hydrogen atom of a neighboring water molecule. Similarly, each of the two hydrogen atoms of those water molecules can attract an electron pair from an adjacent water molecule forming additional hydrogen bonds. Therefore, a single $H_2O$ molecule can simultaneously "hydrogen bond" to as many as four other water molecules as depicted in FIG. 2b. FIG. 2b also depicts the orientation of the $H_2O$ molecules when placed between two charged electrodes, as would be the case in an electrolytic cell. You will note that the poles of the water molecules orient themselves with respect to the negatively and positively charged electrodes, so as to have the oxygen end of each molecule directed toward the positive anode, and the hydrogen end conversely directed toward the negative cathode.

Because of the polar bonding arrangement of water molecules, ions of any dissolved substances are attracted to its poles. The partial negative charges of the oxygen atoms are attracted to the positively charged cations, and the hydrogen atoms, with their partial positive charges, are attracted to the negatively charged anions within an aqueous solution. This unique polar bonding arrangement then becomes the current transport mechanism of an aqueous electrolytic cell, since electrons can be transferred through the bulk of the solution by the migration of positive and negative ions to the electrodes of opposite charge.

As a consequence, when non spontaneous direct currents flow through an ionized aqueous solution, all charged atoms within solution, possessing a distinct quantity of electric charge or even a small integral multiple thereof, will be altered in their chemical composition via a series of electron transfers through a number of intermediate compounds that readily accept and release electrons, thus alternating between oxidized and reduced states. Therefore, in accordance with the laws of thermodynamics, the electrical energy supplied to the system is converted to chemical potential energy, and is subsequently stored in the molecular structure of the newly formed chemical compounds.

Accordingly, the amount of product formed in an electrolytic cell is directly proportional to the measure of electricity that has passed through the cell. In other words, equal amounts of electricity set free the same number of equivalents of substance at the electrodes of an electrolytic cell. The charge in coulombs associated with one mole of electrons is called the Faraday, and is calculated from Avogadro's number and the charge on a single electron. Thus, a Faraday is equal to $(6.022045 \times 10^{23}$ e$^-$/1 mol$) \times (1.6021892 \times 10^{-19}$ C/1 e$^-)$, or 96,484.56 coulombs per mole. A coulomb (C) is defined as being approximately equal to $6.24 \times 10^{18}$ electrons per second. Thus, the gram equivalent weight of a substance involved in any redox reaction is simply the mass in grams produced by the transfer of one mole of electrons. Hence, a Faraday of electricity flowing through an electrolytic cell of the present invention will always produce one equivalent of each product at the appropriate electrode.

An example of how electric power may be supplied to electrolytic cells 10a-e in FIG. 1 of the present invention is detailed in FIGS. 3a, 3b, 3c, & 3d. Looking more particularly at FIG. 3a, you will notice two separate power sources being provided by A.C. isolation transformers 100 and 110. Isolation transformer 100 supplies the electrolytic power requirements for cells 10a-e of FIG. 1. The provision of having an isolated source of power prevents current from flowing in a counter productive way to ground through the aqueous solution. For convenience, simplification and clarification, only the first cell 10a of the series 10a-e is shown as being electrically connected to the power sources shown in FIG. 3a. However, it is to be understood that each of the cells 10a-e would be connected in like manner to the configuration shown for cell 10a.

Thus, those skilled in the art will readily understand, how each of the remaining cells of said series 10b-e of FIG. 1 would be connected. The high current, low voltage, isolated secondary output winding of transformer 100 is rectified to D.C. via bridge rectifier 101. During operation, the positive output 102 of bridge rectifier 101 is connected to anode terminal 50a of cell 10a via closed contact 106a. Similarly, the negative output 103 of bridge rectifier 101 is connected to cathode terminal 51a of cell 10a via closed contact 106b, providing the direct current external energy source of low voltage DC electrical power to support the needed non spontaneous electrolytic oxidation reduction reactions of cells 10a-e of FIG. 1 as described above.

When required, in accordance with the above description, the low current high voltage isolated secondary output winding of ancillary isolation transformer 110 is rectified to D.C. via bridge rectifier 111. During operation, the positive output 112 of bridge rectifier 111 is connected to a terminal of an electrostatic field storage capacitor 116 as shown, as well as to anode terminal 50a of cell 10a via closed contact 106a forming a common anode connection for both electrolytic and electrostatic circuits.

The negative output 113 of bridge rectifier 111 is connected to the opposite terminal of electrostatic intensifying storage capacitor 116 via line 113 and to terminal 52a of electrically isolated electrostatic metallic sheath 22a of cell 10a, thereby, creating the necessary high energy electrostatic ion inducing fields for electrolytic cells 10a, and in accordance with the above description. Furthermore, electrostatic metallic sheath 22a is circumferentially and hermetically cloaked or protected by a non conductive coating or insulating sleeve 31a substantially reducing the potential for current leakage from sleeve 31a and consequent reductions of the high voltage electrostatic field intensity required to ionize molecularly neutral compounds encountered within an aqueous solution. The provision of capacitor 116, as stated above, is to intensify and stabilize the high energy electrostatic field.

Typically, each of the cells 10a-e of FIG. 1 would be electrically connected in a parallel arrangement. However, should one or more of said series of cells necessitate being constructed in an atypical manor, wherein said construction would require a substantially different voltage or current component than that supplied to the remaining cell(s) of said series, those particular cell(s) would be electrically connected to a similar but separate power supply, thereby, providing their individualized and distinct levels of voltage and current potentials.

Figure 3A:
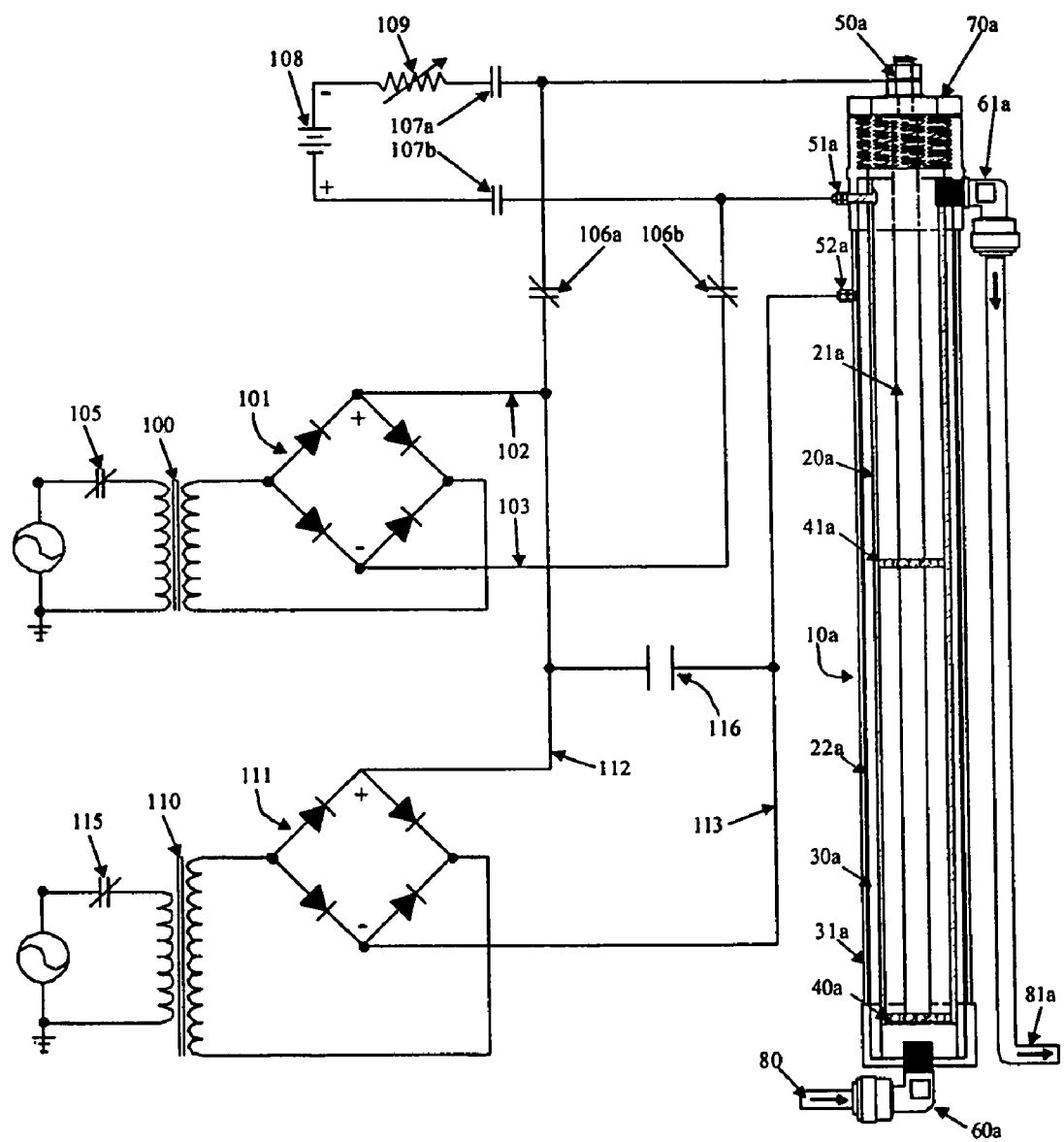
FIG. 3a is an example, electrical schematic, diagram depicting a potential power supply and electrical interconnect to the first of several electrochemical treatment cells within a particular sequential series in accordance with the objects and design centralities of the present invention.

Also illustrated in FIG. 3a is a D.C. biasing power supply 108. Said biasing power supply being provided for the purpose of reducing or eliminating the galvanic corrosion of any electrolytic cell(s) employing electrodes composed of dissimilar materials. For clarification, dissimilar conductive materials produce voltaic or electrode potentials when immersed in an electrolyte such as an aqueous solution. As such, the electrode having the lowest redox potential of the dissimilar pair would have a tendency to corrode away should the unit be shutdown for extended periods of time. Whereas, applying a biasing potential, upon shutdown, to any dissimilar electrode pair will neutralize or substantially reduce this otherwise corrosive action, and provide greater efficacy and longevity for said pair.

Accordingly, the negative polarity of said biasing supply is connected to anode terminal 50a via variable resistor 109 and contact 107a when contact 107a is closed upon shutdown of the treatment process. Conversely, the positive polarity of said D.C. biasing power supply is connected to cathode terminal 51a when contact 107b closes upon shutdown of the treatment process. Once again, for convenience, simplification and clarification, only the first cell 10a of the series 10a-e, is represented as being electrically connected to the biasing power supply 108. Those skilled in the art will understand that any cell of the series having electrodes constructed of like or similarly conductive materials would not require connection to a biasing potential as shown in FIG. 3a.

Variable resistor 109 of FIG. 3a is submitted as an inexpensive means of adjusting the neutralizing bias potential of any dissimilar electrode pair to a predetermined level. A more exacting and precise means would be the utilization of an adjustable, solid state, direct current regulated power supply or similar means.

During operation of the treatment cell(s) of the present invention, contacts 105 and 115 of FIG. 3a are shown to be in the close state, thus energizing isolation transformers 101 and 111. Contacts 106a and 106b of FIG. 3a are also shown to be in the closed state so as to allow the requisite current(s) to flow from bridge rectifiers 101 and 111 to their respective anode(s) and cathode(s), as well as to the electrostatic sheath(s) of treatment cell(s) when required. Biasing circuit contacts 107a and 107b of FIG. 3a are shown to be in their open state position, preventing biasing current flow to their respective anode(s)/cathode(s) during the treatment process.

When the treatment process is discontinued or shut down, each of the afore mentioned contacts states shown in FIG. 3a are reversed. As such, biasing circuit contacts 107a and 107b of FIG. 3a close, applying the requisite biasing potential to their respective dissimilar anode(s)/cathode(s) and contacts 105 and 115 of FIG. 3a open, de energizing isolation transformers 101 and 111. In addition, contacts 106a and 106b of FIG. 3a open, preventing the short circuiting of power supply 108 by bridge rectifiers 101 and 111.

Should alternative D.C. power arrangements to the one disclosed in FIG. 3a, be utilized for providing power to the treatment cell(s) of the present invention, a contact format similar to the arrangement above described would be requisite in order to eliminate short circuiting of the independent or autonomous power systems that may be required.

The above described procedure of applying a biasing potential(s) to treatment cell(s) of the present invention is intended for use only when the off time periods are to be of short duration. For lengthy time periods, it is advantageous to manually or automatically drain the aqueous solution from treatment cell(s) having dissimilar electrodes. Draining, in accordance with the objects of the present invention, not only prevents galvanic action from taking place but it further eliminates the need to waste energy on non productive currents. Furthermore, the drained treatment cell(s) can be filled with a non oxidizing gas such as carbon dioxide to prevent degradation, oxidation, and corrosion of the exposed electrode(s).

Figure 3B:
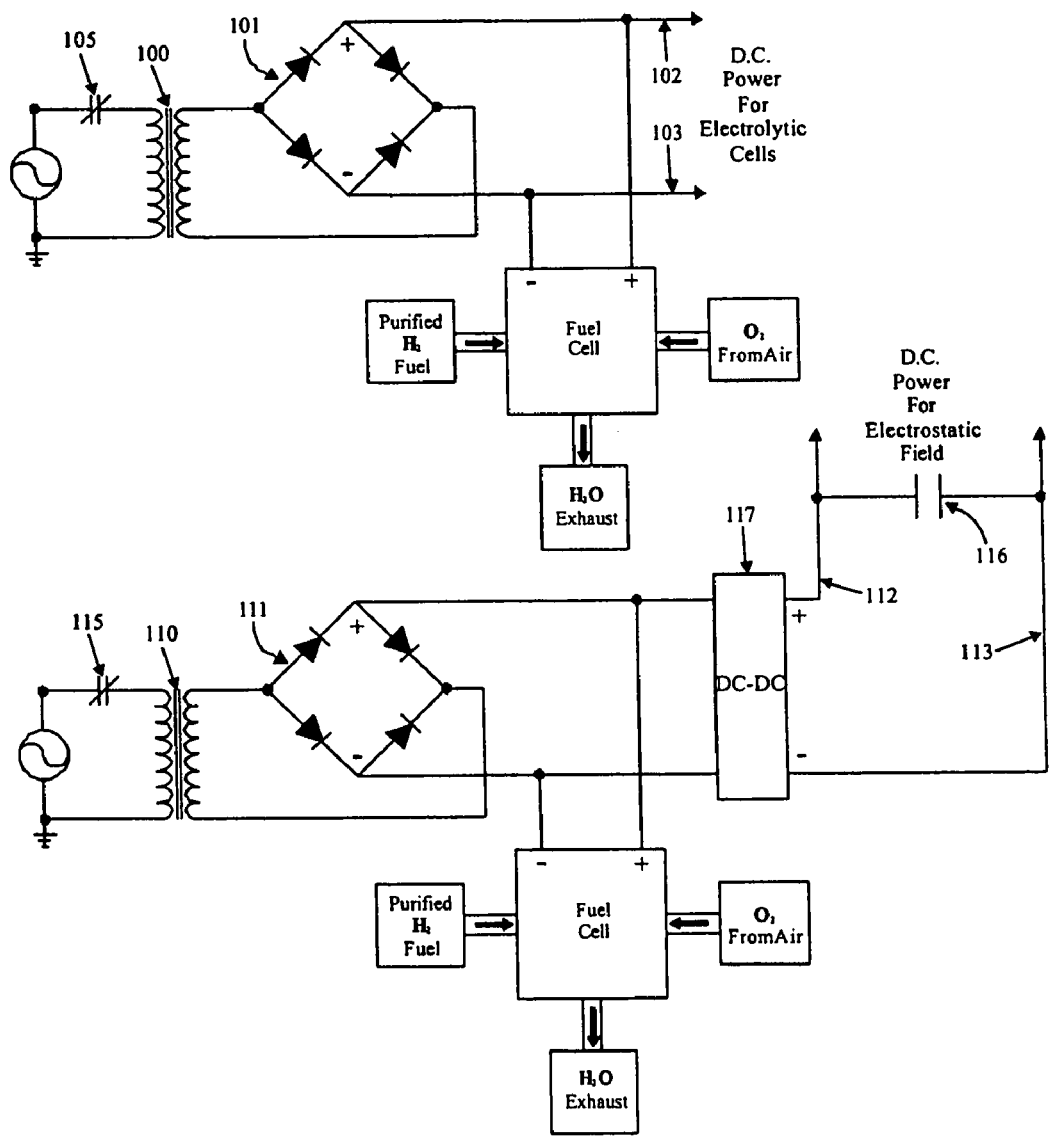
FIG. 3b illustrates a possible variation to the power supply, as shown in FIG. 3a, wherein fuel cells, consume oxygen from the air and the purified hydrogen gas created as water undergoes electrolysis within treatment cells of the present invention, produce direct current electric power sufficient to supplement and offset the total operational energy requirements of the present invention.

FIG. 3b demonstrates the incorporation of a hydrogen fuel cell into the circuitry of FIG. 3a. Said fuel cell utilizes the purified hydrogen gas, collected from the electrolytic cells 10a-e of FIG. 1, in combination with oxygen from the atmosphere, so as to provide supplemental D.C. electric power to offset the required energy costs of operating the present invention. Since the byproduct of the fuel cell's energy production results in the formation of new water, said water production can also be utilized by adding the same to the solution being processed, if desirable.

Figure 3C:
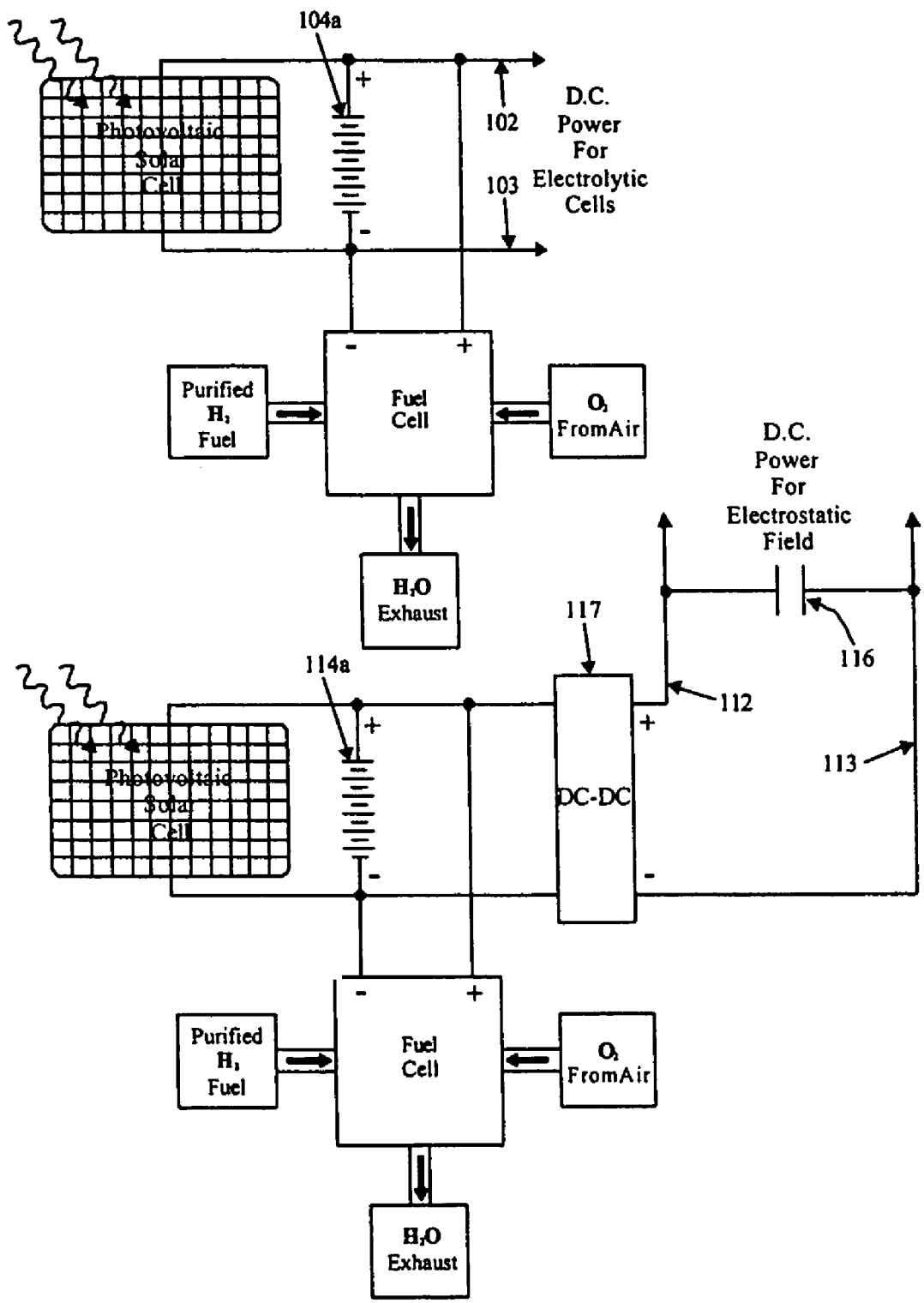
FIG. 3c illustrates a possible variation to the power supply, as shown in FIG. 3a, wherein photovoltaic solar arrays, in combination with fuel cells, are connected to a battery bank, and thereby generate the total operational energy requirements of the present invention.

Since it may become necessary or even desirable to operate the present invention in a remote location, or in an emergency situation such as loss of electrical power, FIG. 3c shows an alternative power supply arrangement for operating the electrolytic/electrostatic cells of the present invention, wherein the required D.C. power is supplied by battery 104a. Said battery is charged by a suitably sized photovoltaic solar array in combination with the earlier disclosed fuel cell arrangement of FIG. 3b.

Figure 3D:
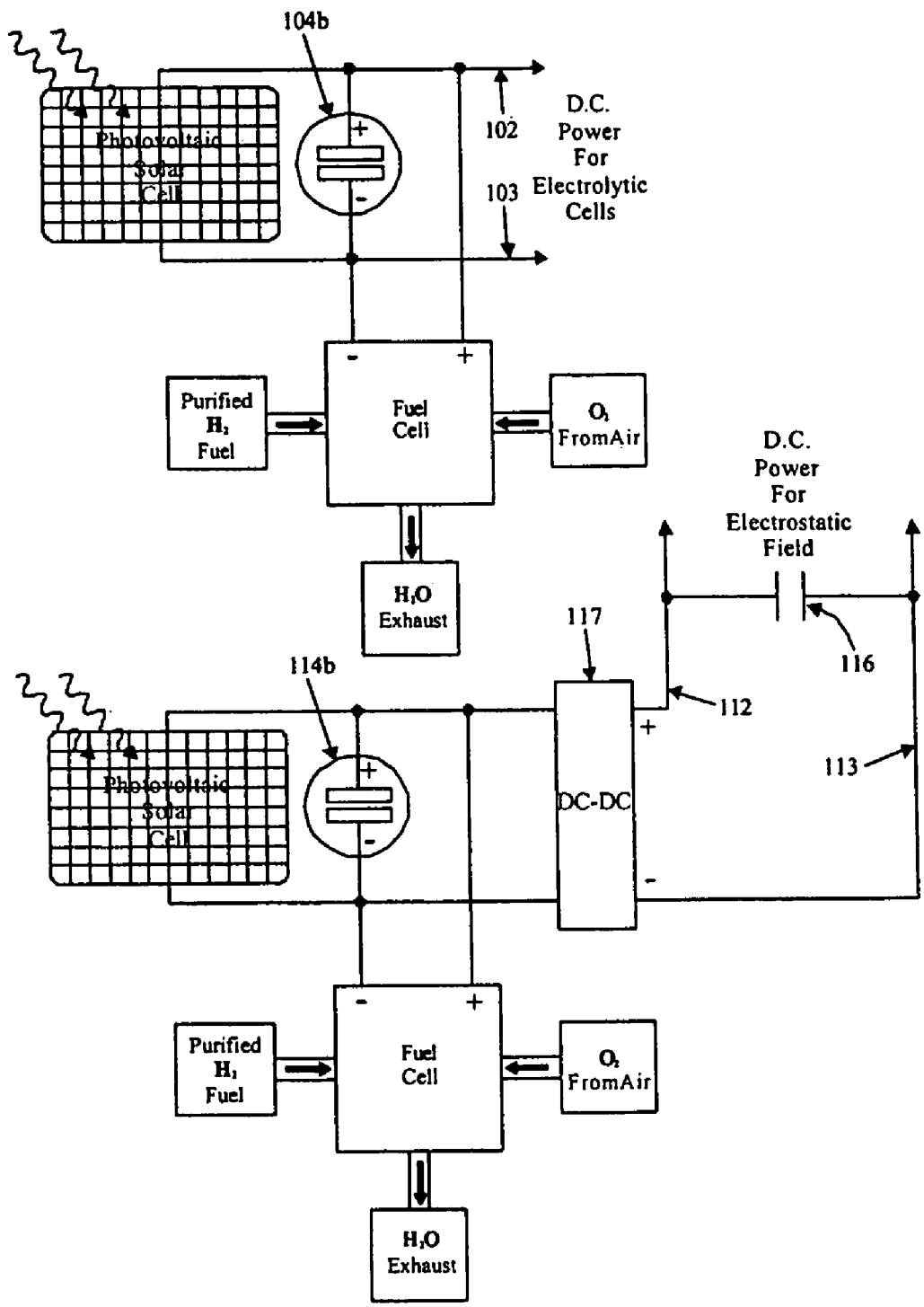
FIG. 3d illustrates a possible variation to the power supply arrangement of FIG. 3c, wherein super capacitors are utilized, in place of the batteries shown in FIG. 3c, thereby increasing the overall efficiency and life expectancy of a stand alone power supply utilized by the present invention.

Likewise, the ancillary D.C. power to operate the high potential electrostatic field of said electrolytic cells of the present invention, is being provided by battery 114a, which in turn is being charged from a suitably sized photovoltaic solar array in combination with a fuel cell arrangement. An alternative to the standalone power system thus described in FIG. 3c is shown in FIG. 3d, wherein, batteries 104a and 114a have been replaced by super capacitors 104b and 114b. Super capacitors 104b and 114b have an advantage over batteries 104a and 114a of FIG. 3c because they have higher charging efficiencies as well as extended life cycles. Consequently, super capacitors can experience a significantly higher number of charge/discharge cycles before they need replacement.

In addition to the above described electrical power sources delineated for use with the present invention, there are also a number of alternate methods, presently known, that could likewise provide the electrical power requirements of the electrolytic/electrostatic cells of the present invention, and any subsequent use of such should not be construed as a departure from the scope or spirit of the present invention as outlined and covered by the claims.

When the afore outlined treatment cell array 10a-e of FIG. 1 is energized via one of the above described power systems, detailed in FIGS. 3a, 3b, 3c, & 3d, electrolytic as well as non electrolytic contaminants are induced to either electroplate out of solution on a cathode surface, or be catalyzed into forming complex, benign, or chemically inert fractions which subsequently coalesce or agglomerate into larger insoluble particles, and as a consequence of this activity, hydrogen gas is produced at the cathode surface. Accordingly, a more complete and detailed description will now be given as to procedure or protocol regarding the removal of the above mentioned precipitate and gas from the treatment cells utilized by the present invention.

Certain chemical species or precipitating compounds within a particular treatment cell may act as both oxidizing and reducing agents. Many of the contaminants encountered within a particular cell may be in a state of oxidation between free or nascent oxygen and oxides and as such, a determination should be made as to how stable or soluble the particular electrochemical fractions may be within a particular cell, and how these may be electrochemically affected or altered if allowed to continue on through the array of treatment cells without being removed from solution. The solubility or stability of particular electrochemical precipitates maybe affected by a specific pH expected to exist within one of the various treatment cells.

Perhaps another determinant for removal may be the commercial value a particular precipitant produced at a particular stage of the treatment process. Therefore, should it be determined that de-gasification, filtration, clarification, soluble ionic separation, or transitional pH adjustment are requisite following a particular treatment cell and before continuing the treatment process, the partially treated solution may be ported first through an ancillary separation system. Such a system may be a soluble ionic separation system or technology facilitating the extraction of soluble ionic species such as nitrates, nitrites, salts, etc., a pH altering system or technology such as a $CO_2$ infusion system, or the solution may be ported directly into a de-gasifying chamber. Such a de-gasifying chamber is exemplified in FIG. 4. The solution enters de-gasifying chamber 120 via aperture 121. The aperture is located appreciably higher in elevation than the solution discharge aperture 127. The electrolytically liberated gasses 122 of the solution 125, are less dense than the other solution constituents and the gasses 122 rapidly ascend to the top of the liquid level 126 in the chamber 120, creating gaseous area 123. The gasses above the liquid level 126 of chamber 120 are ported via transport line 124 to a hydrogen gas purification system, not shown, for use in conjunction with a fuel cell arrangement as described in FIG. 3b, or as a combustible fuel, etc.

Consumption of purified hydrogen gas within a fuel cell in combination with a photovoltaic solar arrangement, as described in FIG. 3c and FIG. 3d above, will allow operation of the present invention in remote locations, as well as in emergency situations. Should it be determined, however, that the hydrogen gas exiting transport line 124 of chamber 120 should have no significant recovery value due to the size or volume of a particular treatment unit built in accordance with the objects of the present invention, the gas may by simply vented to the atmosphere. After the gasses have been removed from the solution 125 of FIG. 4, the solution exits chamber 120 via aperture 127 for further removal of the electrochemical precipitates.

Figure 4:
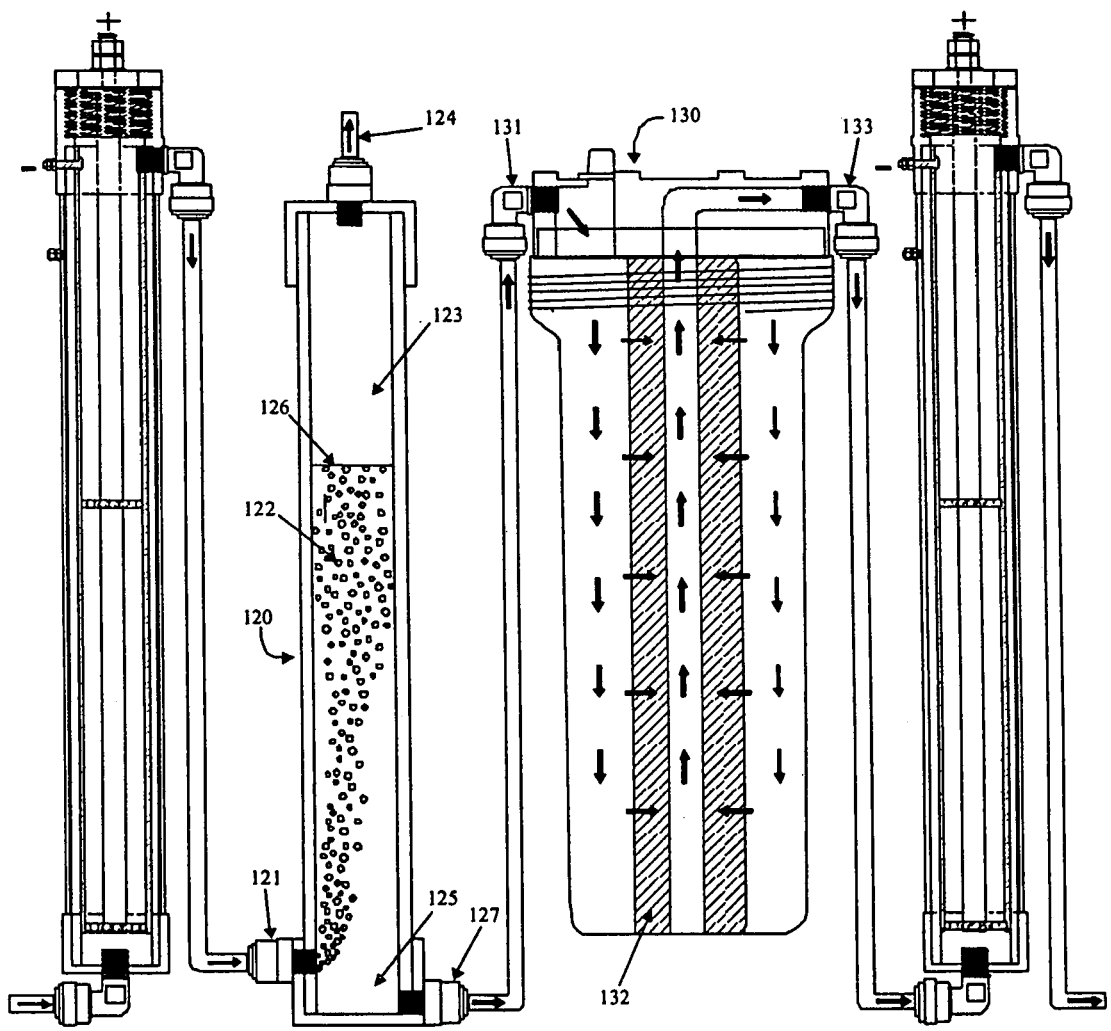
FIG. 4 is a side elevation, longitudinal cross section illustrating one possible means of extracting and harvesting both hydrogen gas and coalesced insoluble chemical precipitates from an aqueous solution treated by a particular cell before entering a subsequent treatment cell(s) in accordance with the objects and design centralities of the present invention.

Precipitates may be removed by a variety of filtration techniques. The type of filtration method utilized by the present invention for a particular application is based upon a number of factors such as volume and flow rate. For example, large scale operations could utilize decantation vessels or tanks, or mechanical clarification systems such as hydro cyclones and centrifuges, etc. For small scale systems, the filtration method could be accomplished inexpensively by employing a back flush filtration system, or an aggregating filtration system, which would provide a means to harvest the various insoluble precipitates. A simple mechanical filter is shown in FIG. 4, wherein the solution aggregate enters filter body 130 via aperture 131, flows through filter media 132, and exits filter body 130 by way of aperture 133. Should the filtration procedure described above, be one of the intermediate stages of the treatment process, the filtered solution would then be ported from aperture 133 into the next treatment cell of the array. Should it follow the final stage of the process, the purified water would then be ready for use as potable water, or other uses.

While utilizing the present electrochemical purifier to provide safe and clean potable water, it is of utmost importance to insure that it operates efficaciously and with maximum electrolytic efficiencies. Therefore, it is essential that the design centralities of the present invention be based soundly upon on the following principles: 1) proper determination and choice of the materials to be employed as electrodes, 2) achieving and maintaining concentricity of the anode with respect to the cathode, 3) ensuring adequate residency time and flow rate of impure solution within each treatment cell, 4) maintaining integrity and functionality of each electrode pair, 5) providing compactness of design, ease and accessibility to perform proper maintenance, and 6) minimization of expended electrolytic energies. Each of the above design directives or focal points of the present invention will be more fully detailed in the course of the ongoing description.

1. Choice of Electrode Materials:

Choosing appropriate electrode pairs for each of the sequentially complimentary cells of the present invention involves a number of factors. For example, it is notably important to have an understanding of the nature of the solution being processed, its relative pH, the various types and relative concentrations of its contaminating fractions, as well as having an understanding as to how each contaminant might react electrochemically. With the above information, one skilled in the art of electrochemistry could then properly determine the correct anode/cathode materials required to promote the sequentially specific redox reactions needed to remove the contaminants from solution, and kill pathogenic microorganisms, while concurrently and finally removing all adscititious elements.

Taking into account the various qualities and constituents of the aqueous solution to be purified, it will be appreciated that the anode(s) of the primary (first stage) treatment cell(s) (in this example, cell 10a of FIG. 1) requisitely sacrifice liberal amounts of their selectively chosen composition into solution during operation. This, in turn, will electrochemically induce susceptible contaminants to combine or agglomerate into heavier, environmentally stable, compounds while in suspension, or at a catalytically specific cathode surface. Many of these newly formed compounds may be capable of precipitating out of solution while in the first electrolytic stage of the process, while others may only be partially prepared, or primed for electrochemical alteration in an ensuing treatment cell(s), via proper selection of electrochemically complementary anode and cathode pairs.

As suggested earlier, it is an important aspect of the present invention to remove via filtration, or other means, any chemically altered precipitates, of a discrete stage, which may later be electrochemically altered in an unfavorable or counterproductive way which allows the precipitate to re-dissolve of to continue through any of the remaining consecutive stages of the process. A further functional choice and corpus of the present invention, as mentioned earlier, is that of selecting an appropriate anode/cathode pair, for a discrete stage of the treatment process which conjunctively aids in the contaminant removal process as well as providing inherent germicidal sterilization. Furthermore, an important functional choice and corpus of the present invention is to select consecutive anode/cathode pairs based upon their ability to produce specific, as well as general, electrochemical redox reactions that facilitate the removal of contaminating fractions and adscititious elements, deposited into solution by the sacrificial anodes, and also, to alter the pH of the solution by a predictably beneficial degree.

Thus, choosing appropriate, sequentially specific, electrode pairs for the present invention requires a working knowledge and understanding of the electrochemical properties of the aqueous solution being purified, and how appropriate selection of the electrodes comprising a sequentially complementary series will achieve the overall objectives of the present invention. A greater understanding will be more fully realized and appreciated as the description continues.

Of the first 103 known elements found on the earth, 75 are known to be metals in their elemental state; a feature related to the presence of one or two weakly bound electrons in the outermost shell of their atoms. The relative freedom or motion of these outer electrons results in its characteristic conductivity as well as its distinctive quality to combine with nonmetals in the formation of positive ions or cations in ionic compounds which is an important feature utilized by the present invention.

In such compounds, the metal ion is always positively charged and the nonmetal ion is always negatively charged. Another characteristic of metals is that they all show similar behavior in various kinds of chemical reactions. For example, their oxides (known as alkaline anhydrides), react with water to form basic or alkaline solutions. As such, this reaction becomes an appreciably important consideration, when choosing electrodes for the cell(s) utilized by the present invention since their reactions can be used to help raise the pH of the aqueous solution being treated.

A unique group of the above metals, referred to as transition elements, starts adding electrons to an inner subshell after certain electrons have taken positions in an outer shell. This happens because the energy levels or shells of the transition elements overlap. Transition metals are also unique in that they are generally electropositive that is, they react by tending to lose, rather than gain, electrons.

Some of the unique characteristics of transition metals are related to their d subshell electrons. They include variable oxidation states, formation of brightly colored compounds, and the tendency to form many complexes. The wide variety of oxidation states for these metals is explained by the ease with which they share their d electrons with other elements in covalent bonds, or allow electrons from other elements to enter their unfilled d orbitals, and as such become an important choice for electrode materials of the present invention, especially, in the primary or initial stages of the electrolytic treatment process.

Seventeen of the first 103 elements are nonmetals. They exist as diatomic or polyatomic molecules in their elemental form, and they share electrons in covalent bonds, and as mentioned above, form negative ions or anions in ionic compounds that are quite easily removed from solution. Nonmetals play an important role in the present invention since they form acidic oxides that can be used in lowering the pH, as well as aid in the hydrolytic separation of amphoteric oxides (hydroxides).

Between the group of metals and nonmetals is a borderline series of elements referred to as semimetals or metalloids. These weakly electropositive metals form amphoteric oxides which react as basic oxides with acids, and as acidic oxides with bases. Interestingly, since water can accept a proton and act as a base, or donate a proton and act as an acid, it is also considered to be an amphoteric substance. Therefore, using semimetals or metalloids as electrodes under certain aqueous conditions can play an important role in the treatment process of the present invention, but more particularly during the intermediate cellular stages.

Accordingly, each of the above described series of elements can play an important role in the present invention; their role will become more apparent during the course of the following description.

Essentially, the electrochemical redox reactions that need to occur within the treatment cells of the present invention are a family of reactions that are associated with the transfer of electrons between species, and as suggested earlier, the redox reactions are a matched set. In other words, you cannot have an oxidation reaction at the anode without an equal but opposite reduction reaction taking place simultaneously at the cathode. Each reaction by itself is called a "half cell reaction," simply because two (2) half cell reactions form a complete or whole reaction.

Any substance that acquires electrons during a redox reaction is termed an oxidizing agent. In the course of the reaction, the oxidizing agent is reduced; a strong oxidizing agent reacts and becomes a weak reducing agent. Of the chemical elements, the most electronegative elements have the greatest tendency to participate in reactions as oxidizing agents, because they form negative ions or gain electrons very readily. Oxygen, for example, is a highly active element. Certain oxygen containing compounds readily give up oxygen to another reactant becoming reduced in the process.

Elements that readily form positive ions are active reducing agents, and as expected from their low electronegativities, the most active are the alkali metals followed by the alkaline earth metals; cesium is the strongest reducing agent of all the naturally occurring elements.

The actual mechanism of the present invention, is not a direct chemical reaction, but a series of electron transfers through a number of intermediate compounds that readily accept and release electrons, and that alternate between an oxidized and a reduced state or form. This route is referred to as the electron transport chain. Since oxygen is generally the strongest oxidizing agent of the chain, within an aqueous solution being treated by the present invention, it usually becomes the final electron acceptor. Accordingly, its vital role is essentially that of a substance on which to "dump" electrons.

The tendency of an element to reduce or donate electrons to hydrogen is variously called the electrode potential, the oxidation reduction potential, or simply the oxidation potential. The potential of fluorine, for example, is +2.87 volts, whereas the superior reducing agent, potassium, has a potential of −2.92 volts. Oxygen has an electrode potential of +1.23 volts. Oxygen is therefore a better oxidizing agent than potassium.

Elements with similar electronegativities form covalent compounds with electrons being shared equally in bonds. Elements with somewhat different electronegativities form polar covalent compounds; in which, the electron cloud forming a bond is displaced slightly toward the more electronegative elements, as is the case with a water molecule as described earlier. Elements with widely different electronegativities form ionic compounds; in which, the electronegative atom forms an anion and the electropositive atom forms a cation.

In summation, determining requisite materials to be utilized as electrodes in the ordered series of the sequentially complimentary electrolytic cells of the present invention, is a selection, based upon the nature of the aqueous solution, its pH, and the contaminants to be removed and their chemical reactivities or tendency to undergo redox reactions. Additional factors include the electronegativities of the prospective elements to be utilized as ordered pairs, their ability to sterilize the solution, remove adscititious materials oxidized into solution by preceding treatment cells, alter the pH in order to aid in the hydrolytic separation of amphoteric substances, remove each of the autochthonous contaminating species, and in short, achieve the desired objectives of the present invention.

Figure 6A:
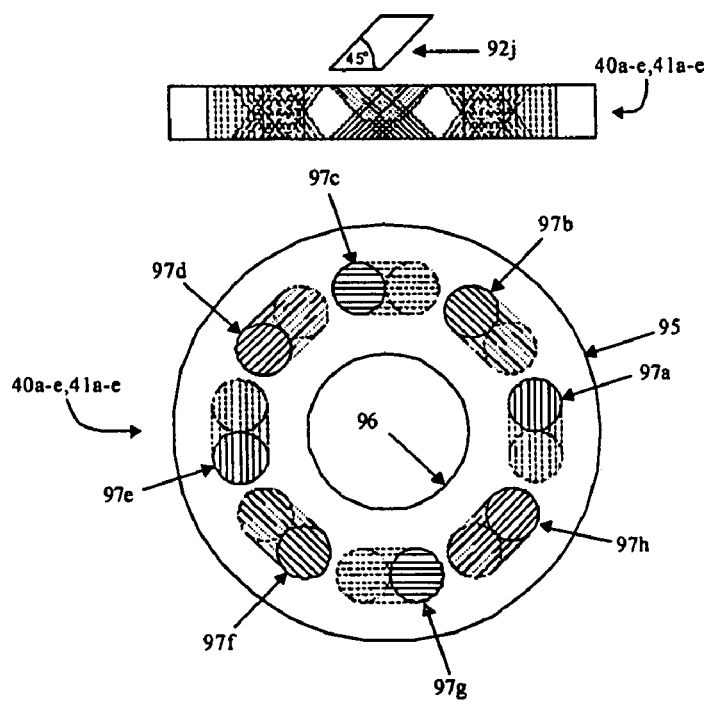
FIG. 6a shows a plan view and an elevation view of a specifically engineered, non conductive, electrode spacing vortical flow inducing member having an axis of rotation angle equal to approximately 45 degrees so as to induce a directionally specific vortical acceleration upon fractions passing through its plurality of equidistant, homocentrically arrayed, biased orifices, in accordance with the objects and design criteria of the present invention.
Figure 6B:
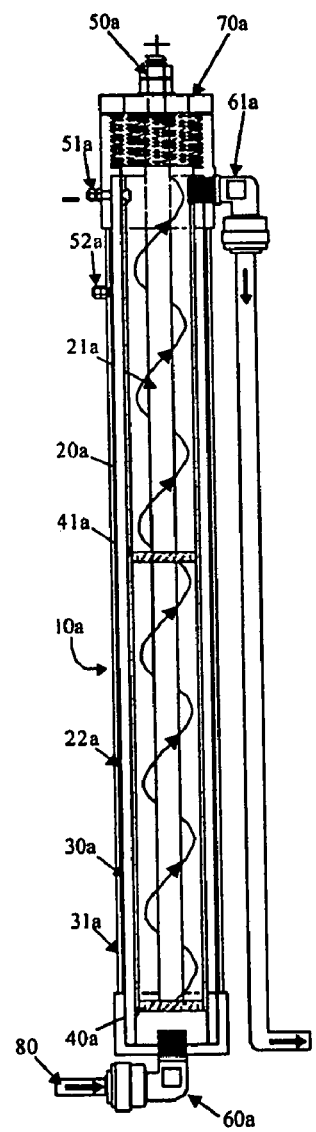
FIG. 6b is a side elevation, longitudinal cross section of an electrochemical cell, designed in accordance with the design criteria of the present invention, illustrating the effect the member shown in FIG. 6a would have upon the solution passing through its homocentric biased orifices.

2. Concentricity of the Anode with Respect to the Cathode:

The electrode spacing vortical flow induction elements 40$a$ $a$ and 41$a$ $e$, of FIG. 1, shown in greater detail in FIG. 5$a$ $b$ and FIG. 6$a$ $b$, are fabricated of electrically non conductive material such as polyvinylchloride (PVC), polymethylmethacrylate (PMMA), polytetrafluoroethylene (Teflon), or a polyethylene plastic such as ultrahigh molecular weight polyethylene (UHMW), or other suitable materials. Looking more particularly at FIGS. 5$a$ and 5$b$ you will see that the electrode spacing vortical flow induction elements 40$a$ and 41$a$ are engineered to induce a directionally specific vortical acceleration upon fractions passing through their plurality of equidistant, homocentrically arrayed, biased orifices 93$a$ 1 having an axis of rotation angle potentially equal to 68 degrees based on flow rate.

The outside diameters 90 of 40$a$ and 41$a$ are sized for a secure fit with respect to the inside diameter of the cathode cylinder wall 20$a$ of cell 10$a$. Due to the sacrificial nature of anode electrodes, as described above, they require periodic replacement, and thus, the inside diameter 91 of 40$a$ and 41$a$ are sized for a loose fit with respect to outside diameter surface of said anode 21$a$ facilitating its easy removal and replacement. FIG. 7$a$ shows a cutaway view of cell 10$a$, shown again in FIG. 7$b$, at electrode spacing members 40$a$ and 41$b$, illustrating the above conformity.

Referring now to FIGS. 6$a$ and 6$b$ you will notice that the electrode spacing vortical flow induction elements 40$a$ and 41$a$ are specifically engineered to induce a more moderate directionally specific vortical acceleration upon fractions passing through its reduced plurality of equidistant, homocentrically arrayed, biased orifices 97$a$-$h$ having an axis of rotation angle potentially equal to 45 degrees based on flow rate. Therefore, it should be recognized that the vortical flow angle, retentivity, and homogenization, within any treatment cell, may be specifically engineered via appropriate orientation of the aqueous fluid directing apertures of the electrode spacing vortical flow induction elements.

Accordingly, referring once again to FIG. 1, the aqueous fluid directing apertures 40$a$ $e$ and 41$a$-$e$ of cells 10$a$-$e$ are placed on an angle substantially between 45 and 68 degrees, thereby, impelling the solution entering each electrolytic cell 10$a$-$e$ to flow in a helical motion between cathodes 20$a$-$e$ and anodes 21$a$-$e$ at an approximately equivalent angle. Additionally, it is believed that the previously described motion removes excessive gas bubble accumulations, and retards the formation of nonconductive films, on or near the surface of the electrodes. The motion thereby inhibits the natural tendency of the cathode and anode elements to become partially depolarized during operation. Moreover, the electrode spacing vortical flow induction elements provide a homogeneous distribution of solution flow through each of the electrolytic cells 10$a$-$e$. The electrode spacing elements provide a means to precisely center the anode with respect to the cathode further enhancing cellular efficiencies by rendering uniform current density along their surfaces.

3. Adequate Residency Time and Flow Rate:

The electrode spacing vortical flow induction elements, detailed in FIGS. 5$a$-$b$ and FIG. 6$a$-$b$, perform the desired function of maximizing solution retention time within each cell ensuring completeness of the treatment process that otherwise would be hampered by the upward movement of electrode off gassing.

Although FIG. 1 shows two electrode spacing vortical flow induction elements per electrolytic cell, certain applications requiring low volumetric flows may require only one electrode spacing and fluid dispersion member due to truncation of the required cell lengths. Again, applications requiring larger volumes of solution, and thus having substantially longer cell lengths, harmoniously would require more than the two electrode spacing vortical flow induction elements shown per cell in FIG. 1. Thus, such changes and modifications, are to be understood to be within the true spirit and scope of the present invention, and are to be understood as being encompassed by the present invention as defined by the claims.

While the cell drawings of FIG. 1 indicate five sequentially complimentary cells 10$a$-$e$ of equal size and length, it should be understood that certain applications may require differing lengths, or even multiples of the same type of cell(s), within the sequencing arrangement.

4. Integrity or Functionality of Each Electrode Pair:

As is well known in the art, during normal operation of a typical electrolytic cell, the surface of the cathode frequently becomes partially depolarized due to the formation of nonconductive hydrogen gas bubbles on its surface which negate its effectiveness to emit electrons for chemical reduction. Furthermore, the surface of the anode may become encircled, or even coated, with nonconductive oxides at or near its surface. This results in pacification of the electrode due to the suppression of its ability to accept electrons for chemical oxidation.

Among the principal advances of the present invention is its ability to overcome the aforementioned electrode pacification, and render electrode equivalency by means of a compensating increase in cathode surface area with respect to the anode in contrast to using parallel plate electrodes, or using larger anodes. Harmoniously, the surface area of the anode should not be substantially less than the surface area of the cathode. Thus, the concentric electrode arrangement of the present invention permits an appreciable reduction in anode surface area with respect to the cathode while maintaining optimum cathode/anode efficiencies and efficacies.

Moreover, the electrode spacing vortical flow induction elements, described above, perform yet another highly significant and innovative function. They maintain electrode efficiencies and efficacies by substantially increasing the aqueous solution's flow rate at or near the electrode surfaces, thereby keeping the afore said surfaces free of nonconductive gas bubbles and encompassing films, which result in electrode pacification. Furthermore, since cathode reduction reactions are diffusion controlled electrolytic reactions, the faster a layer of solution from which ions have been removed is replaced, at the cathode surface, the more efficient the transaction. Consequently, up to a certain point, the faster an aqueous solution brushes across a cathode surface the greater will be its effectiveness in reducing or electroplating out of solution autocathonous contaminants and adscititious elements, since polarization of the aqueous solution is maintained or equalized.

5. Compactness of Design, Ease and Accessability to Perform Proper Maintenance:

The cathodes 20a-e of the preferred embodiment, shown in FIG. 1, substantially have inside diameters of 1 inch, and are approximately twelve inches long. The anodes 21a-e have an outside diameter of substantially ⅜ inches. This innovative, narrow channel arrangement provides a high streaming velocity facilitating a high ion diffusion/transport rate.

Therefore, another principal advancement and advantage of the compact arrangement shown is that it tends to maximize the ratio of cathode surface area relative to the volume of solution being processed, and as such enhances cathode and anode efficiency and efficacy. Furthermore, the compact arrangement of the treatment cells yields a variety of scalable embodiments that may then be installed in space restricted sites, such as homes, offices, and restaurants, or portable units that could be used for emergency situations.

It should, however, be understood that the dimensions given in the example above, shown in FIG. 1, are based on a design flow rate of approximately 50 gallon/day. Consequently, flow rates higher or lower than that of FIG. 1 would result in an appropriate embodiment design alteration that would be unchallenged by those skilled in the art, and in no way is the above illustration or example meant to be limiting as to the size or dimensions of an embodiment which may be required for a particular application or purpose.

6. Minimizing Expended Electrolytic Energies:

As disclosed earlier, purifying water via electrolysis requires direct current energy. However, a substantial quantity of the energy expended can be recovered by collecting and utilizing the hydrogen gas released as a byproduct of the electrolytic process. The efficiency at which the potential energy of hydrogen gas can be converted to a supplementary electric current via fuel cell technology is phenomenal. It is one of the more efficient and thermodynamically favored conversions of matter known to exist at the present time. Additionally, as described above, photovoltaic cells may also be utilized in conjunction with a fuel cell and super capacitor or battery to completely eliminate the need for external power.

To demonstrate the flexibility of the present invention regarding electrode selection and design capabilities, as described above, an example embodiment of the present invention designed for a flow rate of 50 gallon/day, and capable of meeting the recently lowered EPA standard for acceptable levels of arsenic in drinking water, down from 50 μg/L to 10 μg/L, will now be described. The embodiment was constructed for general purpose drinking water purification as well as being specifically tailored for arsenic removal.

Figure 12:
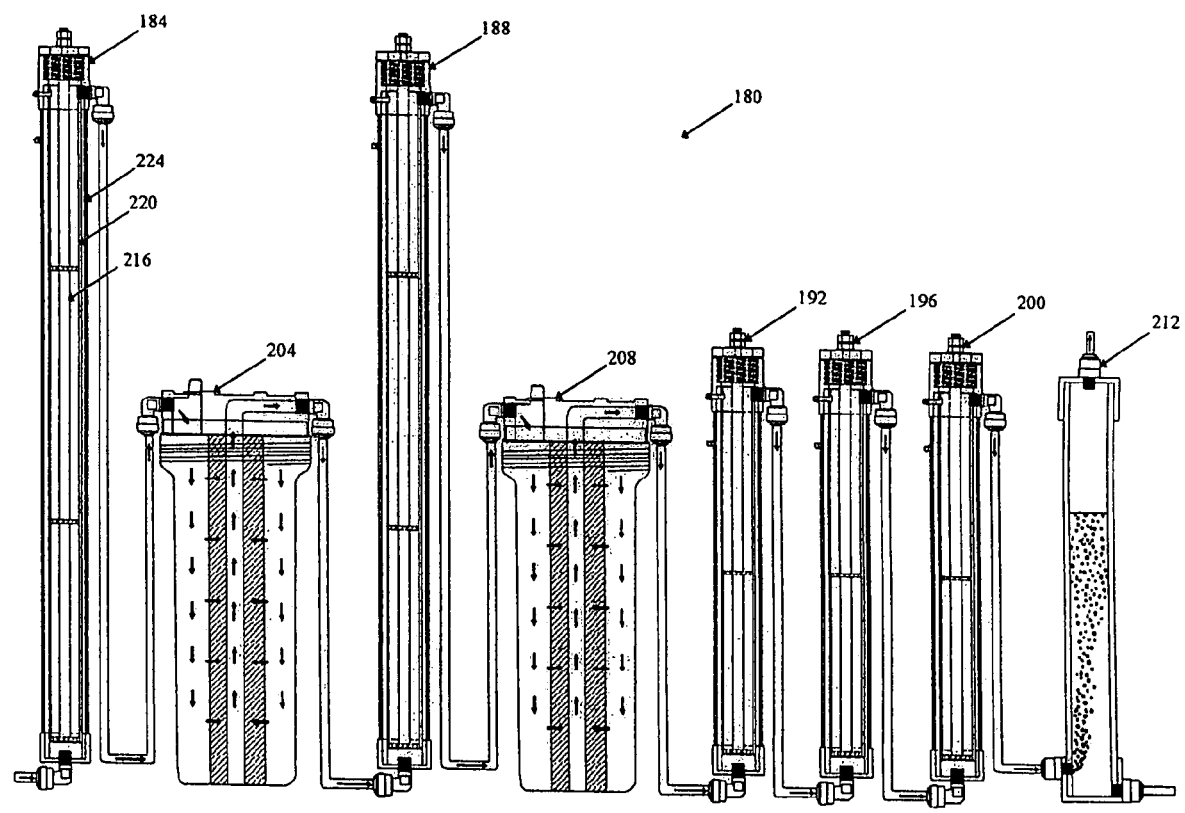
FIG. 12 shows a water filtration system including particulate and gas removal chambers and according to aspects of the present invention.

FIG. 12 shows a side view of a filter according to aspects of the present invention and according to the following example. As the filtration system, indicated generally at 180, was designed for removal of both toxic contaminants and water hardness, the first and second electrolytic cells 184 and 188 are larger than the remaining cells 192, 196, and 200 to ensure near complete removal of the impurities of the water. Filtration canisters 204 and 208 are placed after the first and second cells 184 and 188 to remove precipitates from the water. A gas removing chamber 212 is placed after the final cell 200 to remove gasses from the water. Additionally, a third filtration canister may be placed after the gas removing chamber 212 if desired.

Each particular electrolytic cell may contain different electrical components. For example, the first cell has a central anode 216 which is surrounded by a cylindrical cathode 220. The anode and cathode perform the functions of donating metal ions to the water, donating or accepting electrons from molecules in the water, and facilitating oxidation and reduction reactions within the cell. In addition to the anode and cathode, a metal cylinder 224 has bene placed around the outside of the cell. The metal cylinder 224 allows a electrostatic field to be created in the electrolytic cell to thereby ionize non-ionic compounds in the solution as was previously discussed. The electrostatic field is not required in all cells, and its presence may largely be determined by the specific contaminants of the water supply being filtered. The anodes, cathodes, and electrostatic field may be connected to a power supply and operated as discussed previously.

The filtration system 180 has been designed to precipitate nearly all contaminants from the water which is processed through a system of sequential reduction and oxidation reactions. While the first cell does not remove all contaminants from the water, it prepares many additional contaminants for removal from the water in subsequent cells. In addition to the sequential removal of contaminants, subsequent electrolytic cells remove ions placed into the water by previous electrolytic cells. The first cell places metal ions into the water to facilitate precipitation of contaminants. The second cell removes the metal ions placed into the water by the first cell, and so on until the last cell removes metal ions placed unto the water by the previous cell and does not place metal ions into the water, creating purified water. Accordingly, one of the significant advantages of an electrolytic filtration system according to the present system is that nothing has permanently been added to the water.

Specific metals may be chosen for various anodes and cathodes for additional purposes, such as sterilizing the water. Specific cathodes have been selected for their ability to remove metals from the water, especially those added in previous steps.

Accordingly, the embodiment also has the capability of rendering the processed solution sterile, free of all microorganisms, as well as softening the water by removal of its hard water causing components. It should be understood that the design criteria of the present invention are not limited to any particular flow rate, or contaminant removal capabilities. As such, embodiments utilizing the art of the present invention may be constructed to meet all current, as well as perhaps future drinking water standards, and for any desirable flow rate. Many different sizes and configurations of electrostatic filters may be constructed to meet a wide variety of filtration needs.

The above described embodiment, in similarity to the electrolytic cell array described in FIG. 1, employs five sequentially complimentary treatment cells 10a-e. Unlike FIG. 1, however, the lengths of the first two electrolytic cells of the above embodiment, corresponding to cells 10a and 10b of FIG. 1, are purposefully designed having a length twice that of the remaining three cells 10c-10e of the series, and may be considered by directing attention to Table 1 below.

Accordant to the objects and design paradigms of the present invention, the first electrolytic cell, or cell 10a of the above embodiment, having been specifically tailored for removal of arsenic and general purpose contaminant extraction, its overall length was intentionally increased to ensure or guarantee adequate residency time within cell 10a in order to insure an extraction, or safe level compliant reduction, of the targeted toxic contaminants.

As a consequence of lengthening cell 10a, as described above, cell 10b of the embodiment additionally required a commensurate augmentation in overall length to accommodate the extraction of the increased levels of iron ions, oxidized into solution by the anode of cell 10a. Those skilled in the art will recognize the comprehensive scope and flexibility in design possibilities, with respect to the present invention, which yields numerous efficacious variations in treatment cell composition and dimension, as will become apparent in the ongoing description, and as is expressly covered by the claims.

TABLE 1

| Cell # | Anode Length | Anode O.D. | Cathode Length | Cathode I.D. |
|---|---|---|---|---|
| 10a | 24" | 0.375" | 20" | 1.0" |
| 10b | 24" | 0.375" | 20" | 1.0" |
| 10c | 12" | 0.375" | 10" | 1.0" |
| 10d | 12" | 0.375" | 10" | 1.0" |
| 10e | 12" | 0.375" | 10" | 1.0" |

Moreover, the previously described embodiment employs an aggregating filter, such as the type shown in FIG. 4, following each of the first two treatment cells 10a-b, in order to facilitate the removal of precipitates produced therein, before continuing to the remaining treatment cells 10c-e, as provided and covered by the claims. The purpose, as earlier disclosed, is to prevent further electrochemical alteration of any newly formed, chemically inert, and environmentally friendly precipitate, produced in cells 10a-b, via subsequent and specific electrochemical reactions implemented by ensuing treatment cell(s) employed within the treatment array.

Furthermore, in consequence of the low volume or flow rate of solution being processed within the above disclosed embodiment, electrode off gasses were simply collected, as per FIG. 4, and periodically jettisoned to the atmosphere rather than purified and utilized to offset the operational cost as covered by the claims.

In Table 2, specific composition details pertaining to each of the particularized anode/cathode pairs utilized within the five cell treatment array 10a-e, of the above embodiment, are disclosed. Each row provides the following details: the cell sequence identifier, anodic composition, its elemental series or type, and its electronegativity; these are followed by: the mated cathodic composition, its elemental series or type, and its electronegativity.

TABLE 2

| Cell # | Anode | Series Type | (EN) | Cathode | Series Type | (EN) |
|---|---|---|---|---|---|---|
| 10a | Iron (Fe) | Transition Metal | 1.83 | Iron (Fe) | Transition Metal | 1.83 |
| 10b | Aluminum (Al) | Metal | 1.61 | Aluminum (Al) | Metal | 1.61 |
| 10c | Copper (Cu) | Transition Metal | 1.90 | Aluminum (Al) | Metalloid | 1.61 |
| 10d | Zinc (Zn) | Transition Metal | 1.65 | Copper (Cu) | Transition Metal | 1.90 |
| 10e | Carbon (C(gr)) | Nonmetal | 2.55 | Zinc (Zn) | Transition Metal | 1.65 |

As disclosed in Table 2, both the anode and cathode of cell 10a, of the example embodiment, are made of iron. Iron, having the elemental symbol Fe, appears in Group VIII of the periodic table as a transition metal, and has a Pauling electronegativity of 1.83. Iron is notably important among all the elements utilized as anodes and cathodes by the present invention. In its various compounds, iron is the fourth most abundant element in the Earth's crust. These variant compounds consist of chemical associations with wide variety of the known elements, totaling to over 1000 known minerals. Iron is also biologically important, in trace amounts, providing additional incentive for utilization as electrodes within the present invention.

Within aqueous solutions, iron is easily oxidized, and reacts directly with most common nonmetallic elements, forming compounds in which iron is in a +2 or +3 oxidation state. The chemistry of iron in a +2 or +3 oxidation state is complex; many oxidizing and reducing agents are capable of interconverting their various compounds. Solutions containing iron ions exhibit various chemical and physical properties characteristic of many transition metals. Because of the above mentioned characteristics of iron, its seemingly endless number of chemical compounds, its ability to combine with nonmetals, such as arsenic, and its inherent ability to resist electrolytic pacification by chemical fractions, it naturally became the element of choice for use as electrodes in cell 10a of the example embodiment, as will become more apparent as the description continues.

Describing further, the treatment process that occurs within the first or primary cell 10a, equations 10a(1), 10a(2), and 10a(3) describe part of what either happens, or may happen, at or near the iron anode of cell 10a. Equation 10a(1) depicts the oxidation of the iron anode by oxygen in the system, said oxygen being generated by electrolysis of water at that same electrode site represented by H$_2$O molecule 140 of FIG. 8. In addition, equation 10a(1) indicates that hydrogen ions are being absorbed, and may be visualized by referring to the 2H$^+$ hydrogen ions 141 of H$_2$O molecule 140 of FIG. 8. Equation 10a(2), below, shows the tendency for 4Fe$^{3+}$ ions in solution to form 4Fe(OH)$_3$ hydroxides plus 12H$^+$ hydrogen ions. In order to show the overall effect of what happens, or may happen, in cell 10a, we use the same number of (4) Fe(s) atoms indicated in equation 10a(1) throughout the following description, so that the total effect may be evaluated. Accordingly, it can be seen that the number of protons required during the process ends up being equal to the number of protons produced. At this point, cell 10a contains a pH neutral aqueous solution. The 4Fe(OH)$_3$ (ferric hydroxide) produced in equation 10a(2) is the same as the hydrous ferric oxide shown in equation 10a(3).

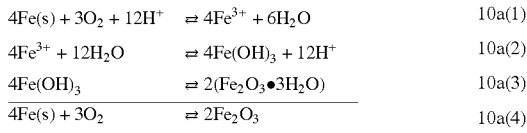

$$4Fe(s) + 3O_2 + 12H^+ \rightleftharpoons 4Fe^{3+} + 6H_2O \quad\quad 10a(1)$$
$$4Fe^{3+} + 12H_2O \rightleftharpoons 4Fe(OH)_3 + 12H^+ \quad\quad 10a(2)$$
$$4Fe(OH)_3 \rightleftharpoons 2(Fe_2O_3 \bullet 3H_2O) \quad\quad 10a(3)$$
$$4Fe(s) + 3O_2 \rightleftharpoons 2Fe_2O_3 \quad\quad 10a(4)$$

Equation 10a(4) above, is the sum of equations 10a(1), 10a(2), and 10a(3), and more accurately indicates what happens at the anode, because the nascent oxygen atoms are very reactive, and may immediately combine with the oxidized iron ions as they develop on the surface of the anode. This is especially true since the nascent oxygen atoms and ferric ions are developing on the same surface in consequence to the magnitude of the electromotive force being applied to the electrodes of cell 10a.

12 volts D.C. was applied to each of the treatment cells utilized by the example embodiment; however, those skilled in the art will appreciate the necessity for adjusting that potential in certain applications, either upward or downward, based on factors such as the conductivity of the solution being treated, in order to effectively treat the solution without excessive temperature rise, or to facilitate the extraction of a certain contaminant or group while leaving others unaffected so as to be extracted later on, or conversely allowed to remain in solution. This process is depicted in FIG. 8, and may be seen by directing attention to the newly formed nascent oxygen atom 145 of FIG. 8.

Figure 8:
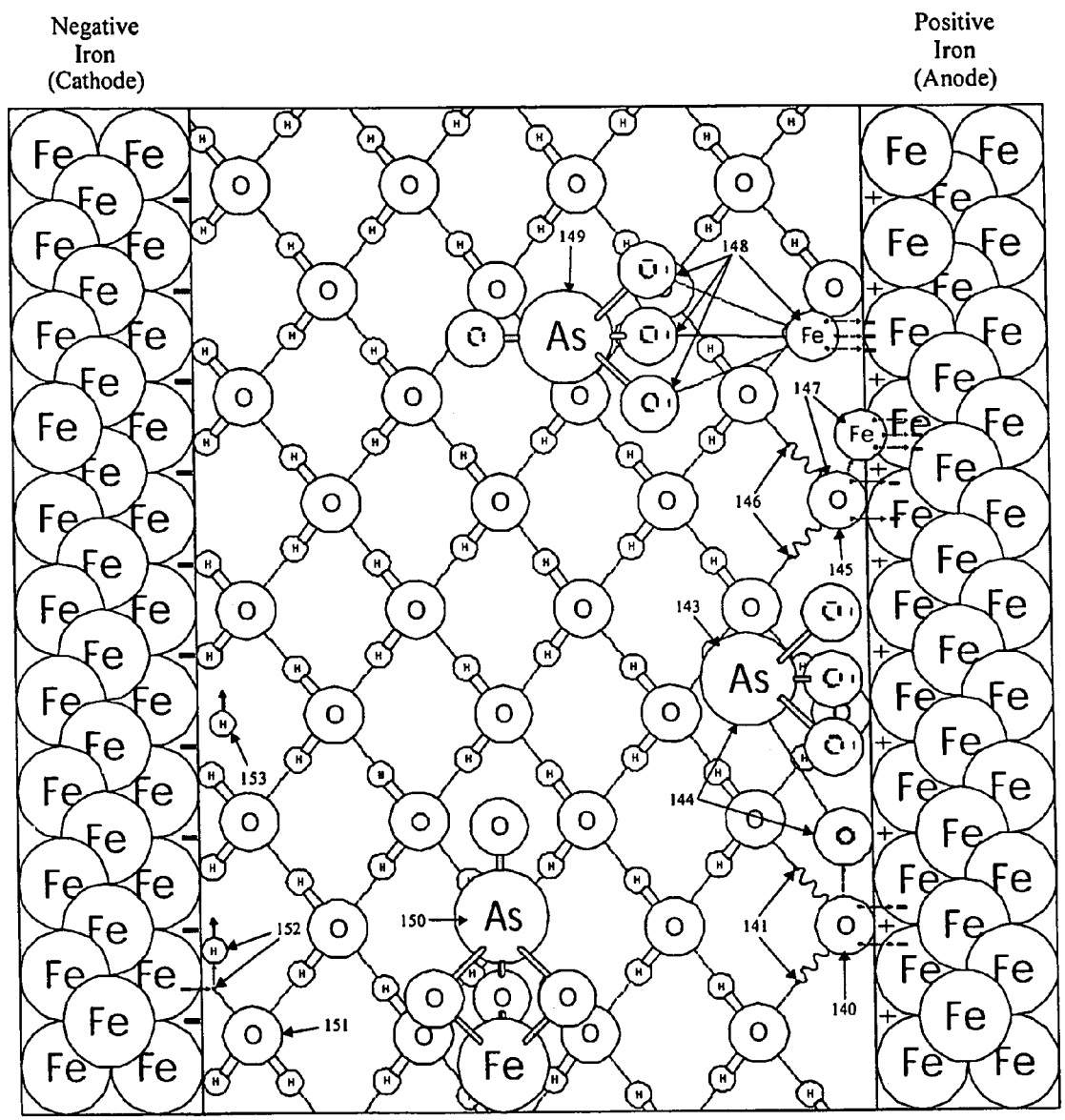
FIG. 8 is a schematic representation illustrating a few of the complex electrochemical reactions that take place, at an atomic level, within a treatment cell of the present invention. In this case, iron was utilized for both the anode and the cathode. Specifically, the schematic illustrates how the present invention is electrochemically able to remove such non metallic elements as arsenic from aqueous solutions.

Oxygen atom 145 of FIG. 8 was formed electrolytically when its covalent bond with two hydrogen atoms as an $H_2O$ molecule, was literally ripped apart at the Fe(s) anode surface by oxidizing or absorbing the electrons from the two hydrogen atoms. Hence, the byproduct of this half cell oxidation reaction resulted in the formation of the two $H^+$ protons 146 shown in FIG. 8. Immediately upon being newly formed at the anode surface, oxygen atom 145 of FIG. 8 is shown forming an attraction with an iron ion being simultaneously produced at the surface of the anode as depicted by 147 of FIG. 8.

So far, the sum of the above reactions results in a pH neutral situation; however, metal oxides, commonly referred to as alkaline anhydrides, create alkaline aqueous solutions. The more active a metal is the more basic a resulting solution will be. Since $Fe_2O_3$ is a metal oxide, it will make a basic aqueous solution, however it will not be strongly basic due to its relatively low reactivity and limited solubility.

Equation 10a(5), below, expresses the dissociation of ferric hydroxide in the extreme. The actual species produced in cell 10a of the above embodiment could be $Fe(OH)_2^+ + OH^-$ or any other combination up to that shown in equation 10a(5). Suffice it to say that equation 10a(5) predicts a somewhat alkaline solution, in accordance with actual measurements taken during operation of the disclosed embodiment, as shown in Table 3 below.

TABLE 3

10a(5)  $Fe_2O_3 + 3H_2O \rightleftharpoons 2Fe(OH)_3 + 2Fe^{3+} + 6OH^-$

| Cell # | Inlet pH | Points From Neutral | Outlet pH | Points From Neutral | Cellular Shift | Change From Original |
|---|---|---|---|---|---|---|
| 10a | 7.81 | 0.81 | 9.61 | 2.61 | 1.80 | 1.80 |
| 10b | 9.61 | 2.61 | 9.41 | 2.41 | −0.20 | 1.60 |
| 10c | 9.41 | 2.41 | 10.18 | 3.18 | 0.77 | 2.37 |
| 10d | 10.18 | 3.18 | 11.35 | 4.35 | 1.17 | 3.54 |
| 10e | 11.35 | 4.35 | 7.50 | 0.50 | −3.85 | −0.31 |

In Table 3, specific pH values pertaining to each of the particularized anode/cathode pairs utilized within the five cell treatment array 10a-e, of the above embodiment, are disclosed. Each row provides the following details: the cell sequence identifier, the pH of the water entering the cell, its incremental pH or points above or below the pH neutral (7.00), the pH of the water exiting the cell, its incremental pH or points above or below the pH neutral (7.00), the change or shift in pH within the cell, and the pH of the water exiting the cell in comparison to the original or beginning pH of the solution. As can be seen, the pH of cell 10a went from 7.81 to 9.61 or an increase of 1.8, in verification of the above outlined equations.

Equations 10a(6), 10a(7), and 10a(8), below, describe the electrochemical processes employed for the removal of arsenic, within aqueous solutions treated by the previously described example embodiment of the present invention. Equations 10a(6) and 10a(7) are the oxidation and reduction half reactions, respectively, for the conversion of arsenite (arsenous acid) to arsenate (arsenic acid). Equation 10a(8) below represents the overall reaction, or sum of the redox reactions of equations 10a(6) and 10a(7). The total reaction voltage of +0.67, in equation 10a(8), is the arithmetic sum of the two half reaction voltages of equations 10a(6) and 10a(7), which indicate, in the presence of oxygen and water, the process is thermodynamically favored.

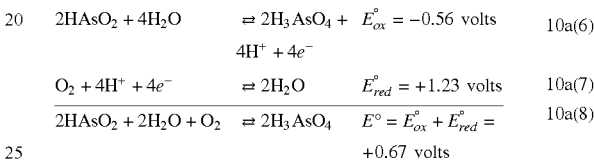

Equation 10a(9), below, represents the source of oxygen, which is the electrolysis of water, as indicated above, and the potential required to do so which is, theoretically, 1.23 volts. Equation 10a(10), below, expresses the sum of 10a(8) and 10a(9) half reactions. Accordingly, 10a(10) indicates, putting in 1.23 volts and get back out 0.67 volts, suggesting the overall reaction requires only a total of 0.56 volts to bring about the combined reaction represented in equation 10a (10). Thus, the presence of arsenous acid in the solution enhances the electrolysis of water. This effect, however, will generally be very slight due to the typically low concentrations of arsenite species encountered within most current potable water sources.

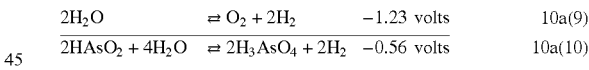

Equation 10a(10), above, further reveals that the oxygen produced by the electrolysis of water is used for the oxidation of the arsenite in solution; whereby, the hydrogen produced by reduction at the cathode will be a byproduct of the cell. In like manner, if you show the source for the oxygen in equation 10a(4), as shown again below, to be from the electrolysis of water, as indicated in equation 10a(11), below, it indicates that the oxygen is spent in the formation of the $2Fe_2O_3$ (ferric oxides), with $6H_2$ (hydrogen atoms) being a byproduct of the total reaction of equation 10a(12). This is in agreement with the observed behavior of cell 10a.

This may be visualized by directing attention to FIG. 8 depicting a newly formed hydrogen atom 153. The above process also being illustrated in FIG. 8, wherein water molecule 151 is represented as transferring a hydrogen proton to the surface of the cathode, wherein, it accepts an electron and becomes reduced to hydrogen atom 152. Accordingly, hydrogen gas produced in this fashion may be collected, purified, and stored as a source of recoverable energy, and may be utilized by the present invention to offset operational costs when deemed appropriate and cost effective.

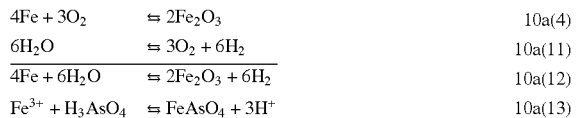

Equation 10a(13) above is the coup de grace or deathblow to the arsenic extracted by this process. Consequently, $Fe^{3+}$ or ferric ions, coming directly from the anode of cell 10a, or otherwise being produced from the dissociation depicted in equation 10a(5), above, unite with arsenic acid ($H_3AsO_4$) to form chemically inert ferric arsenate ($FeAsO_4$) plus $3H^+$ protons which are readily neutralized by the already basic solution. In fact, it is not really proper to represent the arsenate as being associated with protons in the acid form, because of the known pH. However, we have done so, in the above representation, to help keep track of what is happening with the protons on a step by step basis. Once again, there is so little arsenic in most typical drinking water supplies that its presence in the aqueous solutions, generally, has an insignificant effect on the bulk of its pH.

The above described processes, once again may be visualized by directing attention to FIG. 8. Chemical combination 148 represents arsenate molecule 149 combining with a newly formed $Fe^{3+}$ ion at the anode surface, thereby, producing a chemically inert ferric arsenate molecule that, hence, precipitates out of solution as depicted by molecule 150 of FIG. 8.

Figure 9:
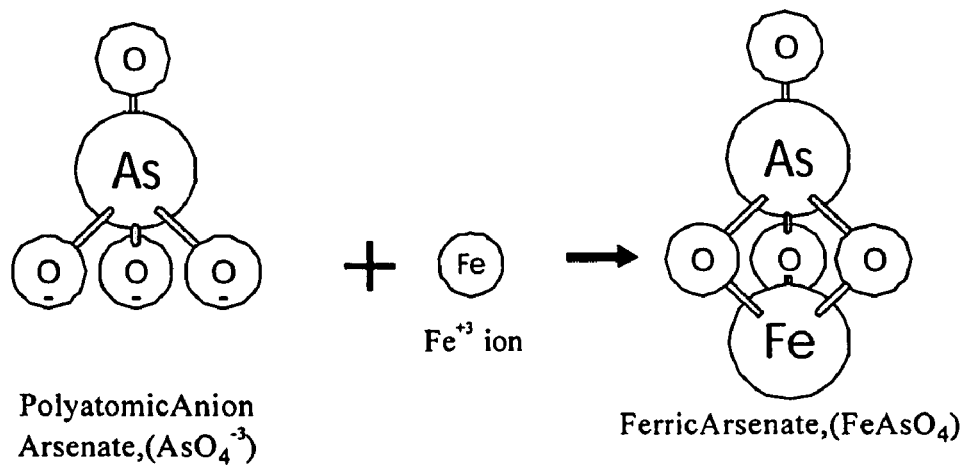
FIG. 9 illustrates how a polyatomic arsenate anion combines with a ferric ion to form a chemically inert ferric arsenate molecule that can precipitate out of solution within a treatment cell of the present invention.

Looking now more particularly at FIG. 9, one may see the formation of a ferric arsenate ($FeAsO_4$) molecule via the chemical combination of a polyatomic arsenate anion ($AsO_4^{3-}$) with a ferric ion ($Fe^{3+}$).

Figure 10:
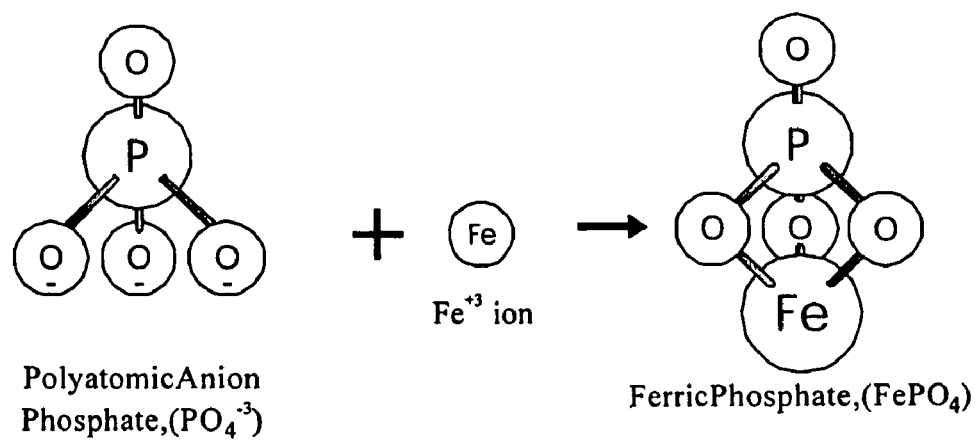
FIG. 10 illustrates how a polyatomic phosphate anion combines with a ferric ion to form a chemically inert ferric phosphate molecule that can precipitate out of solution within a treatment cell of the present invention.

Therefore, one skilled in the art can easily see how, in like manner, a ferric phosphate molecule ($FePO_4$), as shown in FIG. 10, can also be precipitated out of solution via cell 10a as a result of the chemical combination of a polyatomic phosphate anion ($PO_4^{3-}$) and a ferric cation ($Fe^{3+}$)ion from the anode of cell 10a. Thus, it has been shown how cell 10a, of the present invention, may be constructed to remove the entire family of nonmetals encountered within aqueous solutions.

The half cell reaction 10a(14), below, shows the tendency for the nascent oxygen produced at the anode of cell 10a by the electrolysis of water as indicated in 10a(9) and 10a(11), above, to combine and form $O_3$ (g) or ozone.

$$O_2 + H_2O \rightleftharpoons O_3 + 2H^+ + 2e^- \quad E^\circ_{ox} = -2.07 \text{ volts} \quad 10a(14)$$

This half reaction is forwarded by the fact that the cell environment is basic. The reaction of hydroxide ions in the cell with the hydrogen ions acquired during the production of ozone removes the hydrogen ions and, in accordance with LeChatlier's principle, shifts the reaction to the right in favor of ozone production. The fact that nascent oxygen is produced at the anode in the very proximity of newly formed oxygen molecules also enhances the production of ozone in the cells.

Ozone, ($O_3$) is a triatomic molecule of oxygen having three oxygen atoms rather than the usual diatomic, two oxygen atoms. Ozone, having a highly positive electrode potential, spontaneously oxidizes hazardous compounds in the aqueous solution, to an environmentally benign state. Ozone's life span, or oxidative reaction time, is so rapid (<1/10 second) that it does not leave an ozone residual except for increased ORP (oxidative reduction potential) of the aqueous solute which continues to react with contaminants such as toxic herbicides and pesticides to produce harmless precipitates and diatomic oxygen ($O_2$) as a by product.

The redox potential of $O_3$ is only exceeded by elemental fluorine and short lived OH radicals. Ozone's partial pressure, being much lower than that of diatomic oxygen, is absorbed by water, through a bubble interface, fifty times faster than diatomic oxygen. Ozone is a powerful, non selective oxidizer, causing free swimming parasites, bacteria, fungus, molds, and viruses, to undergo lysis. And, as indicated above, the increase in ORP provides continued oxidation and precipitation of all destroyed pathogens, pyrogens, inorganic salts, oxidized metals, mercaptans, chlorinated VOCs, phenols, and some inorganics, all of which can be easily removed from the aqueous solution during any of multimedia filtrations stages of the treatment process.

For example, cyanide (NaCN) is an inorganic compound that can be oxidized in the presence of ozone to a safer state (NaCNO) as follows:

$$O_3 + NaCN \rightleftharpoons NaCNO + O_2$$

Bacterially contaminated water nearly always contains dissolved organic material. Ozone reacts best as an electron transfer acceptor for oxidation of metal ions, and as a dipole addition reagent by addition to carbon-carbon multiple bonds. Therefore, ozone oxidizes these organic hydrocarbons by disassociation, or splitting of the carbon-carbon double bonds of the organic molecules, or by inserting an oxygen atom into a benzene ring producing polar compounds that dissolve in the aqueous solution, and are removed via electrochemical precipitation. If anthropogenic organic materials are present in the solution, they will also be destroyed by ozone with the reactions described above.

Additionally, colloidal particles that cause turbidity in the aqueous solution are maintained in suspension by negatively charged particles that are neutralized by ozone. Ozone further destroys colloidal materials by oxidizing the organic materials that occur on the surface of colloidal spherical particles. Many heavy metals are oxidized to their less soluble, higher oxidation states, and the insoluble oxides, or hydroxides, both form precipitates that may be removed by the described multimedia filtration processes of the present invention.

Decomposition of the $O_3$ molecule within the aqueous solution is initiated by the oxidation of complex metal ions, hydroxide ions, formate ions, and a variety of other species as described above. It decomposes by a complex mechanism that involves the generation of hydroxyl radicals (OH) that are, as indicated above, among the most reactive oxidizing species within the aqueous solution. In pure water, long chain reactions are produced. A single initiation step can result in the decomposition of hundreds of molecules of ozone before the chain ends. By the time the aqueous solution exits the treatment cells of the present invention, all $O_3$ molecules will have been spent in chemical reactions.

To eliminate redundancy, it should be understood that ozone can also be an oxidative reaction in each of the remaining electrolytic cells, as will become apparent in the course of the following description.

As further disclosed in Table 2, above, both the anode and cathode of cell 10b, of the example embodiment, are composed of aluminum. Aluminum, having the symbol Al, appears in Group IIIA of the periodic table as a metal, and has a Pauling electronegativity of 1.61. Aluminum is the most abundant metal in the earth's crust, and is the third most abundant element. Because of its strong affinity to oxygen, however, it never occurs as a metal in nature, and is only found in the form of its many compounds, the sum of which total nearly 800 minerals.

The use of aluminum as electrodes of the present invention is based upon a number of factors, and as implied above, a key reason is its high electrochemical reactivity with other elements. As a cathode of the present invention, aluminum is a favorable choice because of its excellent reducing capacity, and its ability to remove any unused or adscititious iron irons oxidized into solution by prior cell 10a, as will be shown below. As an anode, aluminum is used because of its ability to produce beneficial gelatinous amphoteric hydroxides and to oxidize auspicious aluminum oxides into solution, that combine with various contaminating fractions to form chemically inert precipitates. Although aluminum plays no known biologically significant role, its high reactance, and other various beneficial qualities, provides adequate incentive for utilization as complimentary electrodes within the second cell 10b of the series, as will be more fully appreciated during the ensuing description.

Within aqueous solutions, aluminum is easily oxidized, and reacts directly with the contaminating fractions forming compounds in which aluminum is in a +3 oxidation state. Similar to the transition metal iron electrodes of cell 10a, many aqueous contaminants within solution are capable of interconverting their various compounds with aluminum in a variety of beneficial redox reactions.

The treatment processes that occur within the second cell 10b are similar in nature to those described for cell 10a. For example, the following equations 10b(1), 10b(2), and 10b(3), below, closely resemble the first three equations describing the reactions of the prior cell 10a. Accordingly, equations 10b(1), 10b(2), and 10b(3) describe part of what either happens, or may happen, at or near the aluminum Al(s) anode of cell 10b.

Equation 10b(1) depicts the oxidation of the aluminum anode by the nascent oxygen generated by electrolysis of water at the same electrode. In addition, equation 10b(1) indicates that hydrogen ions are being absorbed in the process. Equation 10b(2), below, shows the tendency for $4Al^{3+}$ ions in solution to form $4Al(OH)_3$ hydroxides plus $12H^+$ hydrogen ions.

In order to show the overall effect of what happens, or may happen, in cell 10b, we again use the same number of (4) Al(s) atoms indicated in equation 10b(1) throughout the following description of cell 10b, so that the net effect of the reactions can be determined. Accordingly, it may be seen that the number of protons required during the process ends up being equal to the number of protons produced, having no effect upon the pH of the solution. The $4Al(OH)_3$ (aluminumhydroxide) produced in equation 10a(2), is the same as the hydrous aluminum oxide shown in equation 10b(3) below.

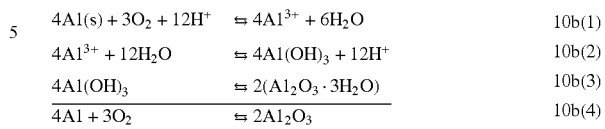

| | | |
|---|---|---|
| $4Al(s) + 3O_2 + 12H^+$ | $\leftrightarrows 4Al^{3+} + 6H_2O$ | 10b(1) |
| $4Al^{3+} + 12H_2O$ | $\leftrightarrows 4Al(OH)_3 + 12H^+$ | 10b(2) |
| $4Al(OH)_3$ | $\leftrightarrows 2(Al_2O_3 \cdot 3H_2O)$ | 10b(3) |
| $4Al + 3O_2$ | $\leftrightarrows 2Al_2O_3$ | 10b(4) |

Equation 10b(4), above, is the sum of equations 10b(1), 10b(2), and 10b(3), and more accurately indicates what happens at the anode, since the nascent oxygen atoms are very reactive, and may immediately combine with the oxidized aluminum ions as they develop on the anodic surface in consequence to the 12 volt direct current electromotive force applied to the electrodes of cell 10b. Unlike the $Fe_2O_3$ oxide formed by the anode in cell 10a, the aluminum oxide $Al_2O_3$ of equation 10b(4) is insoluble, and consequently will not substantially alter the pH of the solution.

Equation 10b(5), below, depicts the dissociation of aluminum hydroxide.

$$Al_2O_3 + 3H_2O = 2Al(OH)_3 \qquad 10b(5)$$

Additionally, those skilled in the art will recognize that aluminum hydroxide, derived in equation 10b(2), above, is a hydrated amphoteric species. Amphoteric hydroxides are compounds that readily dissolve in an acidic or basic solution, but not in a pH neutral solution. Similarly, water is an amphoteric substance in that it may accept a proton and act as a base, or donate a proton and act as an acid. The processes described are related to the electronic configurations of amphoteric elements since the reaction properties (tendency to gain, lose, or share an electron) arise from the electron configuration.

Another notably important reaction occurring in cell 10b, is one in which the above mentioned gelatinous aluminum hydroxide behaves as a quasi zeolite. Each of the oxygen atoms within the ($OH^-$) ion end up having two non bonding pairs of electrons that collectively form attractions with the positive metal cations in solution. Since each of the respective metal cations are also associated with counter negative anions in solution, both co precipitate out of solution via the hydroxide ion. Furthermore, because of the gelatinous consistency of the hydroxide, it engulfs particles suspended within solution, and drops them out as well. The net effect is a reduction in overall hardness (reduced $Ca^{2+}$ and $Mg^{2+}$ metal cations), a reduction in overall salinity, and a reduction in turbidity.

In accordance with actual pH measurements taken during operation of the example embodiment, as disclosed in Table 3, above, a pH altering component that consistently ensues in cell 10b is one in which the redox reactions of cell 10b substantially extract all lingering traces of adscititious iron fractions within solution. The aqueous redox reactions 10b (6), 10b(7), and 10b(8), below, explain how the aluminum electrodes of cell 10b, are able to extract the adscititious iron species discharged into the aqueous solution by the Fe(s) anode of the anticipatory cell 10a. As previously described, oxidation always occurs at the anode, and reduction at the cathode, of an electrochemical cell.

Thus in the redox reaction of 10b(6), below, the (Al(s) $\leftrightarrows Al^{3+}$(aq)+3e$^-$) half cell of reaction is an electrochemical anodic oxidation reaction, and the $(3(Fe^{3+}(aq)+e^- \leftrightarrows Fe^{2+}))$ half cell is an electrochemical cathodic reduction reaction.

The conjugated whole reaction (Al(s)+3Fe$^{3+}$+3e$^-$⇌Al$^{3+}$+3e$^-$+3Fe$^{2+}$) is the sum of the two half cell reactions. The overall potential for the whole reaction is the sum of the two half cell potentials which equals 2.433 volts. Accordingly, it should be understood that each of the various redox reactions, given in the course of the following description, will follow the above format in order to explicate what is taking place within each cell of the treatment series.

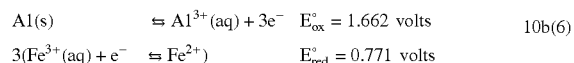
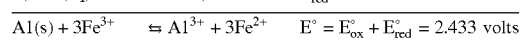
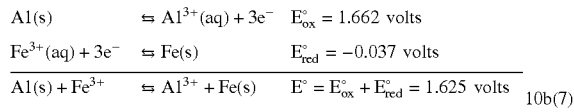

10b(6)

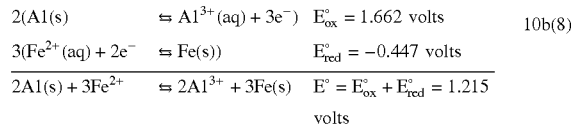
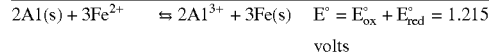

10b(7)

$$\begin{aligned} 2(Al(s)) &\rightleftarrows Al^{3+}(aq)+3e^-) \quad E^\circ_{ox}=1.662 \text{ volts} \\ 3(Fe^{2+}(aq)+2e^-) &\rightleftarrows Fe(s)) \quad E^\circ_{red}=-0.447 \text{ volts} \\ \hline 2Al(s)+3Fe^{2+} &\rightleftarrows 2Al^{3+}+3Fe(s) \quad E^\circ=E^\circ_{ox}+E^\circ_{red}=1.215 \text{ volts} \end{aligned}$$

10b(8)

It will be appreciated that in each of the various reactions of cell 10b, above, the overall potential is positive, and as such, each of the reactions will occur spontaneously. In other words, the likelihood of their occurrence within cell 10b is favored thermodynamically.

Regarding each of the above named reactions, those skilled in the art will recognize additional unspecified aqueous chemical species that may be extracted from an aqueous solution via similar reactions employing the Al$^{3+}$ ion species oxidized into solution by the Al(s) anode of cell 10b, thereby, sustaining the incumbent electrochemical treatment process.

As further outlined in Table 2, above, the anode of cell 10c is composed of copper, while its respective cathode is composed of the dissimilar metal aluminum. We have already delineated the relevance of aluminum as an electrode, and copper has several very unique characteristics and qualities when used as electrodes that may be employed by the present invention as in the example embodiment.

Copper, having the symbol Cu, appears in Group IB of the periodic table as a transition metal, having a Pauling electronegativity of 1.91. In its various compounds, copper is the 26th most abundant element in the Earth's crust, and is found in more than 530 minerals. Within aqueous solutions, copper exhibits oxidation states of the +2 or +1; the most common being +2, since copper in the +1 oxidation state is only stable when it is part of a stable complex ion.

Although the electronic configuration of copper is formally similar to that of the alkali metals (Group IA), in general, and potassium in particular, the behavior of copper is considerably different from that of the alkali metals. Even though the shielding of the outer electron from the attracting force of the nucleus is stronger in copper than for the alkali metals, the smaller atomic radius makes copper's outer electron more tightly bound. This results in a comparatively high first ionization potential, and a relatively small ionic radius.

Copper is an essential trace element for many plants and animals, including humans, therefore, it plays an important part in life sustaining biochemical oxidation and reduction reactions. Copper can also be an important element used in the redox reactions, of the present invention, wherein it undergoes cyclic changes between Cu$^+$ and Cu$^{2+}$ oxidation states.

One of the more outstanding features of copper with respect to its role within the present invention, and in particular its use as an anode in cell 10c, is that both copper oxide and hydroxide are produced thereby. Copper hydroxide, in particular, is lethally toxic to all lower forms of life such as bacilli, fungi, and algae. Accordingly, any concentrations of these lower organisms, having potentially escaped any subordinate germicidal mechanisms inherent to the first two treatment cells of the example embodiment, are ultimately and universally destroyed by the cupric species of cell 110c rendering the treated solution biologically sterile. The metal aluminum is used as the cathode in cell 10c of the present embodiment to remove any unused or adscititious aluminum ions oxidized into solution by prior cell 10c as will be shown below.

Similar to the treatment processes that occur within the afore described cells 10a and 10b, similar complimentary processes take place within the third electrolytic cell 10c. Accordingly, equations 10c(1), 10c(2), and 10c(3) describe, in part, what either happens, or may happen, at or near the copper (Cu) anode of cell 10c. Equation 10c(1) depicts the oxidation of the copper anode by nascent oxygen generated by electrolysis of water at that same electrode site. In addition, equation 10c(1) indicates that hydrogen ions are being absorbed in the process.

Equation 10b(2), below, shows the tendency for Cu$^{2+}$ ions in solution to form Cu(OH)$_2$ hydroxide plus 2H$^+$ hydrogen ions. Once again, in order to show the overall effect of what happens, or may happen, in cell 10b, we must use the same number of Cu(s) atoms indicated in equation 10c(1) throughout the following description of cell 10c, so the net effect of the reactions can be determined. It may be seen that the number of protons required during the process ends up being equal to the number of protons produced, consequently having a nil effect upon the pH of the solution. The Cu(OH)$_2$ (copper hydroxide) produced in equation 10c(2) is the same as the hydrous copper oxide shown in equation 10c(3) below.

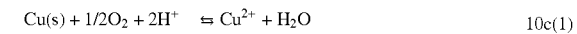
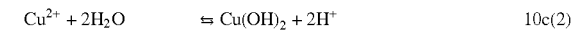
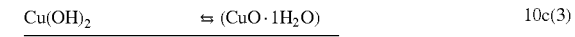

10c(1)
10c(2)
10c(3)
10c(4)

Equation 10c(4), above, is the sum of equations 10c(1), 10c(2), and 10c(3), and more accurately indicates what happens at the anode, since the nascent oxygen atoms are very reactive, and may immediately combine with the oxidized copper ions as they develop on the anodic surface in consequence of the 12 volt direct current electromotive force applied to the electrodes of cell 10c. Since the cuprous oxide CuO of equation 10c(4) is somewhat more soluble than the Fe$_2$O$_3$ of cell 10a, it will consequently render a more basic aqueous solution than that produced by the Fe$_2$O$_3$ of cell 10a.

Equation 10c(5), below, depicts the dissociation of cupric hydroxide, which has the tendency to raise the pH.

$$CuO + H_2O \rightarrow Cu(OH)_2 \leftrightarrows Cu(OH)^+ + OH^- \qquad 10c(5)$$

The following aqueous redox reactions 10c(6) and 10c(7), below, explain how the copper anode and aluminum cathode of cell 10c are able to extract the adscititious aluminum species discharged into the aqueous solution by the Al(s) anode of the anticipatory cell 10b.

$$\begin{array}{lll}
3(Cu(s)) & \leftrightarrows Cu^{2+}(aq) + 2e^- & E°_{ox} = -0.3419 \text{ volts} \\
2(Al^{3+}(aq) + 3e^-) & \leftrightarrows Al(s)) & E°_{red} = -1.662 \text{ volts} \\
\hline
3Cu(s) + 2Al^{3+} & \leftrightarrows 3Cu^{2+} + 2Al(s) & E° = E°_{ox} + E°_{red} = -2.0039 \text{ volts}
\end{array} \qquad 10c(6)$$

$$\begin{array}{lll}
3(Cu(s)) & \leftrightarrows Cu^+(aq) + e^- & E°_{ox} = -0.521 \text{ volts} \\
Al^{3+}(aq) + 3e^- & \leftrightarrows Al(s) & E°_{red} = -1.662 \text{ volts} \\
\hline
3Cu(s) + Al^{3+} & \leftrightarrows 3Cu^+ + Al(s) & E° = E°_{ox} + E°_{red} = -2.183 \text{ volts}
\end{array} \qquad 10c(7)$$

Of interest, you will note, in each of the redox reactions of cell 10c, above, the overall potentials are negative. As such, each of the reactions are considered to be non spontaneous. However, as mentioned earlier, such reactions may be constrained to occur by means of an external energy source of direct current electric power applied to the electrodes of cell 10c, and in this particular case 12 volts DC. Thus, reactions 10c(6) and 10c(7), above, yield an effective cellular working potential of 9.9961 and 9.817 volts respectively.

In order to offset the counter emf, and speed up the overall reaction times, substantially greater electromotive potentials may be applied to individual electrolytic cells employed by the present invention. However, in the above case it has been observed that doing so exhibits a tendency to coat the copper anode with a film of black copper oxide, which seemed to hinder the overall process. Therefore, taking into account the nature and dispositions of the materials employed as anodes and cathodes of the present invention, discretion should be used with regard to the magnitude of emf that may be effectively applied to non spontaneous and spontaneous cellular reactions.

Regarding each of the above named reactions, those skilled in the art will recognize additional unspecified aqueous chemical species that may be extracted from an aqueous solution via similar reactions employing the $Cu^{2+}$ ion species oxidized into solution by the Cu(s) anode of cell 10c, thereby, sustaining the incumbent electrochemical treatment process.

As further outlined in Table 2 above, the anode of cell 10d is composed of zinc, while its respective cathode is composed of the dissimilar metal copper. We have above delineated the characteristics and importance of copper as an electrode. Zinc also has some very unique characteristics and qualities that are also of importance in relation to its being utilized as electrodes in the present embodiment and invention.

Zinc, having the symbol Zn, appears in Group IIB of the periodic table as a transition metal, having a Pauling electronegativity of 1.65. Zinc is the 24th most common element in the Earth's crust and is found in over 200 minerals. Within aqueous solutions, zinc forms compounds only in the +2 oxidation state. Zinc is a metal of very low toxicity in its ordinary compounds and is an essential trace element in both plant and animal life, thus becoming one of the important elements of choice in the present invention. The metal copper is used as the cathode in cell 10d of the present embodiment to remove any unused adscititious copper ions oxidized into solution by prior cell 10c as will be shown below.

In further describing the treatment process that occurs within the second cell 10d, equations 10d(1), 10d(2), and 10d(3) describe in part what either happens, or may happen, at or near the zinc (Zn) anode of cell 10d. Equation 10d(1) depicts the oxidation of the zinc anode by oxygen in the system, said oxygen again being generated by electrolysis of water at that same electrode site. In addition, equation 10d(1) indicates that hydrogen ions are being absorbed in the process. Equation 10d(2), below, shows the tendency for $Zn^{2+}$ ions in solution to form $Zn(OH)_2$ hydroxides plus $2H^+$ hydrogen ions as well.

Once again, in order to show the overall effect of what happens, or may happen, in cell 10d, we again use the same number of Zn(s) atoms indicated in equation 10d(1) throughout the following description of cell 10d, so the net effect of the reactions can be determined. Once again, it can be seen that the number of protons required during the process ends up being equal to the number of protons produced, having no effect upon the pH of the solution. The $Zn(OH)_2$ (zinc hydroxide) produced in equation 10d(2), also is the same as the hydrous zinc oxide shown in equation 10d(3) below.

$$\begin{array}{lll}
Zn(s) + 1/2 O_2 + 2H^+ & \leftrightarrows Zn^{2+} + H_2O & 10d(1) \\
Zn^{2+} + 2H_2O & \leftrightarrows Zn(OH)_2 + 2H^+ & 10d(2) \\
Zn(OH)_2 & \leftrightarrows (ZnO \cdot H_2O) & 10d(3) \\
\hline
Zn(s) + 1/2 O_2 & \leftrightarrows ZnO & 10d(4)
\end{array}$$

Equation 10d(4) above, is the sum of equations 10d(1), 10d(2), and 10d(3) and more accurately indicates what happens at the anode, since the nascent oxygen atoms are very reactive, and may immediately combine with the newly oxidized zinc ions as they develop on the anodic surface, in consequence to the 12 volts direct current electromotive force being applied to the electrodes of cell 10d. Since the zinc oxide ZnO of equation 10d(4) somewhat more soluble than the $Fe_2O_3$ of cell 10a, it therefore will make a more basic aqueous solution, than that produced by the $Fe_2O_3$ of cell 10a.

Equation 10d(5) below depicts the dissociation of zinc hydroxide, which has the tendency to raise the pH.

$$ZnO + H_2O \rightarrow Zn(OH)_2 \leftrightarrows Zn(OH)^+ + OH^- \qquad 10d(5)$$

It will also be recognized by those skilled in the art that, zinc hydroxide derived in equation 10b(2), above, is a hydrated amphoteric species, similar to the aluminum hydroxide of cell 10b. Therefore, this compound can also play an important factor in the overall pH of the solution.

Zinc hydroxide is also similar to the aluminum hydroxide in that this gelatinous hydroxide also behaves as a quasi zeolite, wherein each of the non bonding pairs of the oxygen electrons form attractions with the positive metal cations in solution, co precipitating them and their associated counter negative anions out of solution with the zinc hydroxide molecule.

Furthermore, the gelatinous consistency of the zinc hydroxide, engulfs suspended particles, as did the aluminum hydroxide, and precipitates them out as well. The net effect is a substantial reduction in overall hardness due to (reduced $Ca^{2+}$ and $Mg^{2+}$ metal cations), as well as a reduction in overall salinity and aqueous turbidity.

The following aqueous redox reaction 10d(6) below, explains how the zinc anode and copper cathode of cell 10*d*, are capable of removing the adscititious copper species discharged into the aqueous solution by the Cu(s) anode of the anticipatory cell 10*c*.

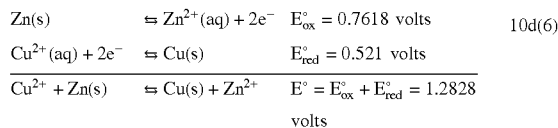

Regarding the above reaction, those skilled in the art will recognize additional unspecified aqueous chemical species that may be extracted from an aqueous solution via similar reactions employing the $Zn^{2+}$ ion species oxidized into solution by the Zn(s) anode of cell 10*d*, thereby, sustaining the incumbent electrochemical treatment process.

As outlined in Table 2 above, the final two electrode pairs utilized in cell 10*e* of the present embodiment, consist of an anode made of carbon, and a complimentary cathode composed of zinc. The metal zinc is an excellent reducing agent and is used in cell 10*e* of the present embodiment to remove any unused or adscititious zinc ions oxidized into solution by prior cell 10*d*. The use of carbon, on the other hand, is the most novel and contrasting of all the anodes utilized by the present embodiment.

Carbon, having a Pauling electronegativity of 2.55, is represented by the symbol (C). It appears in Group IVA of the periodic table along with silicon, germanium, tin, and lead. Unlike many other groups in the periodic table, the IVA group of elements differ greatly from one another in their chemistry, carbon being the least representative of the group in its behavior. It is the lightest and least metallic of the group. In fact, carbon is denoted as being a nonmetallic chemical element.

Carbon is the most versatile of all the elements known. Ninety four percent of all known compounds (more than 4 million) contain it. In fact, only carbon is capable of combining with other elements in arrangements of sufficient variety and complexity to fulfill the essential functions on which life depends. One of carbon's most abundant compounds is the gas, carbon dioxide, which constitutes about 0.05% of the atmosphere and is found dissolved in all natural waters.

Whenever the element carbon is used as a reactant or electrode, as in the case of the present embodiment, it is necessary to utilize graphite, as indicated in Table 2 above, and which is written as C(gr). Graphite is considered to be chemically inert, and is an excellent conductor of both heat and electricity. Graphite molecules are composed entirely of planes of trigonal carbon atoms joined in a honeycomb pattern, as illustrated by 160 in FIG. 11*a*. These molecular planes or levels are capable of outward expansion by additional trigonal carbon atoms as represented by dashed lines 162 of FIG. 11*a*.

Figure 11A:
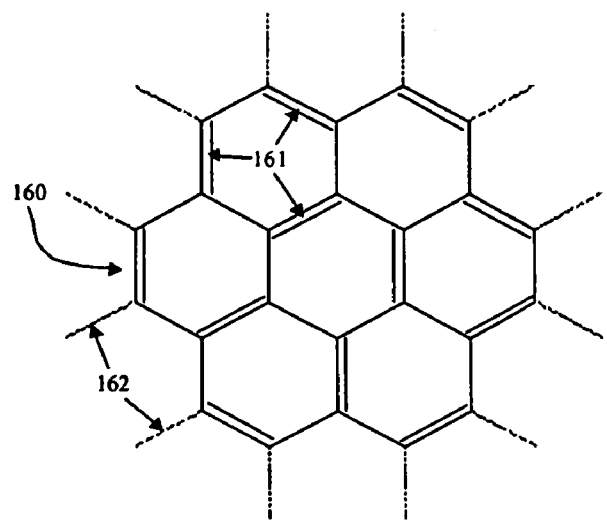
FIG. 11a shows a schematic representation of how carbon atoms reside within a plane, or single layer graphite molecule, forming a honeycomb pattern of trigonally arranged carbon atoms, wherein, every other carbon atom is bonded in an effective or resonant 4/3 bonding arrangement.

Each carbon atom, within each level, is bonded to three other carbon atoms at 120 degree angles, with every other bond (in the extreme resonance depiction) being a double bond, as characterized by 161 of FIG. 11*a*. In actuality, the electrons are resonating throughout the structure so that the other extreme depiction would be having the places shown in FIG. 11*a* as single bonds become double bonds and vice versa. If you were to combine all the possible resonance structures, the bonds would all be the same, and the average bonds would effectively be "4/3 bonds."

Figure 11B:
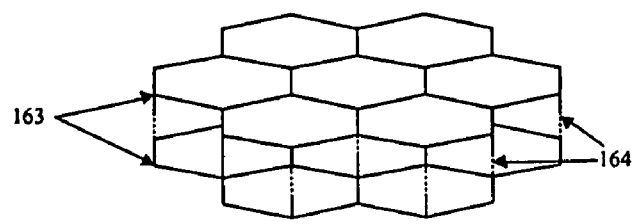
FIG. 11b is a perspective view of two molecular graphite layers, or planes, showing the weak bonding arrangement between them, wherein, the un-bonded free electrons of the layers give graphite its ability to conduct an electric current, and serve as a final anode of the present invention.

These planes are arranged in sheets or layers, stacked one above the other, like a pack of cards, as depicted by 163 of FIG. 11*b*. Weak bonds with free electrons exist between layers, and are represented by dashed lines 164 of FIG. 11*b*. Because each atom is formally bonded to only three neighboring atoms, the remaining valence electron (one in each atom) is free to circulate via a weak bonding arrangement within each plane of atoms, contributing to graphite's ability to conduct electricity as though it were a metal.

As was described above, in each of the anticipatory cells of the present embodiment, oxidation took place at their respective anode surfaces, wherein $H_2O$ was electrolyzed producing nascent oxygen atoms. These newly formed oxygen atoms either combine immediately with adjacent oxygen atoms to form $O_2$ or $O_3$, or they produce metallic oxides that hydrolyze in solution to yield a basic solution. Likewise, a similar process occurs in cell 10*e* of the present embodiment. Since the anode of cell 10*a* is composed of conductive graphite carbon C(gr), oxidation will also take place on its surface. The first reaction within cell 10*e* being the electrolysis of water ($H_2O \leftrightarrows H_2 + \frac{1}{2}O_2$). This reaction can be broken up into its two half cell reactions as follows:

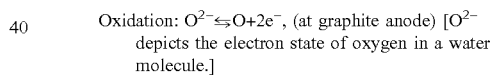

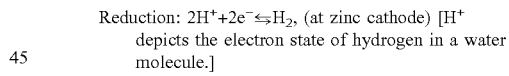

In the half reaction shown for the anode, the oxygen is shown as a single atom, exactly the way in which it is released from the water molecule. Since oxygen has only six valence electrons, it requires two additional electrons to form a stable outer structure. Therefore, these single or nascent oxygen atoms are extremely reactive, and as indicated above, if there is another oxygen atom nearby, it will instantly combine with it, to form an $O_2$ oxygen molecule. However, there is another immediate source of electrons available for the nascent oxygen atoms to share electrons with, the C(gr) atoms of the anode. These C(gr) atoms must first be removed from the anodic surface.

Since nascent oxygen atoms produced at the anode surface are second only to fluorine in oxidizing strength, fluorine being the strongest and most active oxidizing agent known, it therefore has the power to acquire, by oxidation, the carbon atoms it needs from the anode. Consequently, some of the nascent oxygen atoms form bonds with the surface carbon atoms, removing them from the anode surface. The carbon is oxidized by the oxygen and the oxygen is reduced by the carbon, as illustrated in the following redox reaction 10e(1) below.

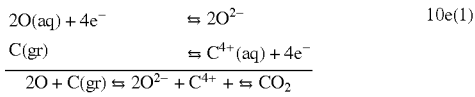

Once carbon dioxide is introduced into the solution, it starts reacting with the water to become carbonic acid, $H_2CO_3$ as indicated in 10e(2) below.

The carbonic acid of 10e(2) above, partially dissociates to bicarbonate ions and hydrogen ions; thus reducing the pH of the solution as indicted by reaction 10e(3) as follows:

The evidence given empirically by the reduction of pH in this cell suggests strongly that this or something similar is taking place in cell 10e of the present embodiment. Although there may be a number of intermediate steps, we believe the above to be a fairly accurate rendering of what happens on the macro scale. The reactions are similar to what is going on at the other electrodes; the difference being that in cell 10e, the non metal oxide $CO_2$ was formed, whereas the prior cells produced metal oxides.

Non metal oxides are acid anhydrides (acids without water) and metal oxides are alkaline (basic) anhydrides (bases without water). When you put them in water they form acids and bases respectively.

The degree of the acid nature or basic nature is dependent upon the solubility of the oxide and the dissociation constant of the resultant acid or base. Carbon dioxide is very soluble, and only dissociates to a moderate extent. This limited dissociation is a good thing as it moderates the effect of the non metal oxide on the pH of the liquid. It is also beneficial that carbon dioxide forms a carbonate conjugate base upon dissociation, as most heavy metals form insoluble carbonates so that those that have the least soluble carbonates, such as lead, will tend to precipitate as the last vestiges of any remaining heavy metals combine with the carbonate ions formed by the carbon dioxide.

Additionally, an important follow up cleaning reaction occurs in cell 10e as the pH is being lowered via the formation of carbonic acid within the cell. Any remaining amphoteric species having become dissolved in the solution during the treatment process, such as $Al(OH)_3$, $Cu(OH)_2$, and $Zn(OH)_2$, precipitate back out of solution as the pH approaches neutral. Similarly, any extraneous amphoteric species such as $Be(OH)_2$, $Sn(OH)_2$, $Pb(OH)_2$, $Cr(OH)_3$, $Ni(OH)_2$, and $Cd(OH)_2$, precipitate out of solution via hydrolytic separation.

With regard to hardness removal in this final cleaning stage, any calcium salt that has not precipitated out in an earlier stage, will precipitate out in this final stage as calcium carbonate. Additionally, any magnesium that has not precipitated out as magnesium hydroxide in prior cells will precipitate out in this cell as well.

Upon exiting cell 10e, of the present embodiment, the fully processed solution was channeled into a de-gasifying and precipitate removal arrangement, wherein the remaining gasses separated from the aqueous solution and all remaining precipitates, not filtered or removed after the first two stages, were removed through filtration, leaving purified potable water. In Table 4, below, you will see that the above described process of present embodiment, substantially removed the arsenic from 669 ppb to 0.811 ppb or well below the 10 ppb requirement set by the E.P.A.

TABLE 4

| Private Well, Jacobs Road, Churchill County, Nevada | | | | |
|---|---|---|---|---|
| | ppm | mg/L | ppb | µg/L |
| Arsenic Before Treatment: | 0.669 | 0.669 | 669 | 669 |
| Arsenic After Treatment: | 0.000811 | 0.000811 | 0.811 | 0.811 |
| Percent Removal: | 99.88% | | | |
| Hardness Before Treatment: | 85.5 | 85.5 | 85,500 | 85,500 |
| Hardness After Treatment: | 0.0001 | 0.0001 | 0.1 | 0.1 |
| Percent Removal: | 100% | | | |

You will also notice in Table 4 that the above described treatment process completely removes the hardness fractions from the water according to aspects of the present invention. While not strictly necessary for making the water potable, removal of the water hardness is desirable by many people.

Figure 13:
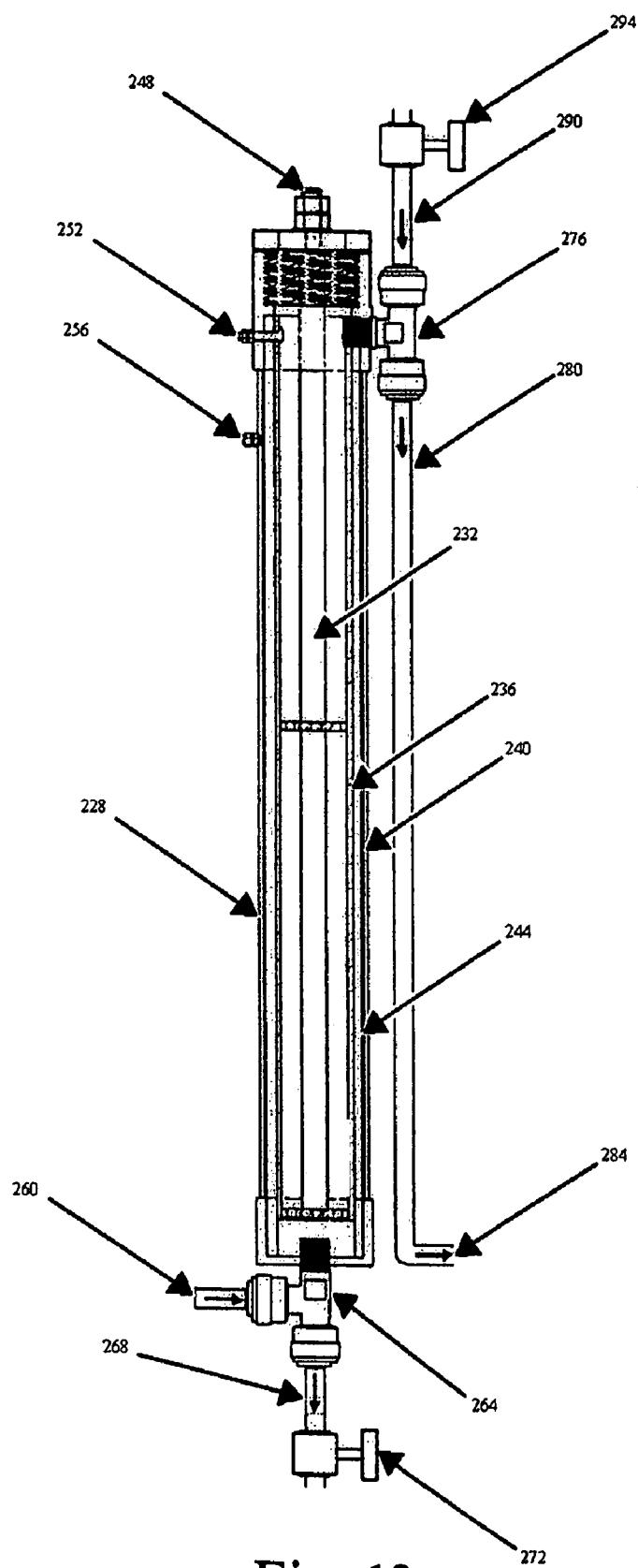
FIG. 13 shows an electrolytic cells according to some aspects of the present invention.

Referring to FIG. 13, a single electrolytic cell 228 is shown. The cell 228 is illustrated with many of its individual components, such as the anode 232, cathode 236, electrostatic field element 240, thin electrically insulating member 244 which insulates the electrostatic field member from the liquid. Also shown are electrical connections such as the anode connection 248, cathode connection 252, and electrostatic field member connection 256.

FIG. 13 illustrates how alterations may be made to the plumbing connections of an electrolytic cell according to the present invention to increase the functionality of the invention. For example, the fluid inlet line 260 may enter a tee fitting 264 which would allow the fluid to flow into the cell 228 or out drain line 268. A valve 272 may be used to control the flow out of the drain line 268, and the valve may be manually operated or connected to a control system for automatic operation, as is desired. The exiting water also passes through a tee fitting 276, allowing the water to flow out an exit tubing 280. The end 284 of exit tubing 280 is typically connected to another cell or filter member, or may be the final exit for filtered water. The tee 276 may be used to allow the water to be routed through tubing 290 to another piece of equipment, may be used in introduce a gas into the filtration system, or may be used to facilitate draining of the filtration cell 228. Flow through the line 290 would typically be controlled with a valve 294, which also may be manual or automatic.

It will be appreciated that by using a variety of valves and fittings as illustrated by FIG. 13, the filtration system may be made to function in a variety of different configurations. Water may be routed to different portions of the filtration system according to the filtration needs, or possibly according to the maintenance needs of the system. Additionally, operations such as draining parts of the filtration system may be facilitated, making other operations including maintenance of the filtration system easier. It will be appreciated that having different valves and alternate drain or fill lines connected to an electrolytic cell may not be necessary in a small residential or personal water filtration unit, but that such additional parts may be necessary for larger commercial or municipal filtration systems.

Although the use of a DACS (Data Acquisition and Control System) or a PLC (Programmable Logic Controller) is not a functional imperative of the present invention, adjunct implementation of such will greatly simplify the operation of the filtration system in certain applications; particularly in remote, large scale, or high volume flow embodiments. The primary benefits inherent to these artificially intelligent systems and technologies include an efficient and effective means for reducing the necessity of human intercession.

The controller can be used to notify the operator of any pending maintenance requirements or situations, safeguard accidental human exposure to the potentially dangerous electric potentials utilized by the present invention, and coordinate the use of collateral treatment systems and technologies used in conjunction with the present invention. The controller may also provide a monitored and controlled means for periodic, short term, reverse polarization of electrodes which may be at times requisite to revitalize the efficiency and efficacy of certain anode/cathode pairs that may be employed within a treatment array.

In addition to managing the application of DC bias voltages, the controller can govern the automatic, albeit elective, evacuation of the aqueous solution contained within predetermined treatment cells to a sewer or wastewater treatment system after operating voltages are disengaged and/or following a reverse polarization of electrodes. The controller thus facilitates an automated means whereby the evacuated solution may be electively replaced with $CO_2$, or any other efficacious, non hazardous, environmentally amenable compound, and can provide an automated means to monitor or regulate the voltages or currents applied to various cells employed within a treatment array of the present invention.

Additional considerations and benefits to the use of a separate controller system include a means to monitor environmental temperatures; solution temperatures, pressures, pH, and conductivities; volumetric flow, filtration integrity, etc.

Accordingly, a controller may be connected to a variety of probes and sensors including, but not limited to, pH sensors, ion sensors, water salinity sensors, water density sensors, temperature sensors, flow rate sensors, voltage sensors, and the like. Additionally, a controller may be connected to a variety of output devices such as automatic valves, switches, electrical switches, etc. These sensors would be connected to the filtration system in appropriate locations, such as in an electrolytic cell or in a tubing or pipe so as to be in contact with the water, or control devices such as valves would be connected to the tubing or pipes and may replace conventional fittings such as elbows or tees in the tubing.

Due to the adjunct and functionally diverse nature of these artificially intelligent automation and control systems and technologies, a detailed schematic would only serve to limit rather than expound upon the virtually limitless connections or implementations of these devices as they relate to the present invention. Those skilled in the art and use of such will appreciate the various ways the present invention might be connected to, and automated or monitored by, these various ancillary devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for purifying water comprising:
   selecting an electrolytic purification device, the device comprising a plurality of electrolytic cells wherein each electrolytic cell comprises an anode and a cathode and wherein at least one anode comprises a first metal, and at least one anode comprises a second metal different from the first metal, wherein the electrolytic cells are electrically isolated from other cells and wherein the electrolytic cells are connected such that water flows sequentially through the cells;
   connecting the anodes and cathodes of the plurality of cells to a direct current power supply;
   causing water to flow sequentially through the electrolytic cells;
   causing metal ions to be deposited in the water from the first metal in a first electrolytic cell;
   removing the metal ions deposited from the first metal in a second electrolytic cell;
   causing metal ions to be deposited in the water from the second metal in the second electrolytic cell; and
   removing the metal ions deposited from the second metal in a third electrolytic cell; and
   depositing carbon dioxide into the water from a carbon anode in the third electrolytic cell to thereby lower the pH of the water.

2. The method according to claim 1, wherein the method further comprises depositing metal ions into the water to thereby destroy micro-organisms which are in the water.

3. The method according to claim 1, wherein the method further comprises selecting an electrolytic purification device comprising at least one electrolytic cell which further comprises an electrostatic field capable of ionizing non-ionic molecules which are dissolved in the water.

4. The method according to claim 1, wherein the method further comprises selecting an electrolytic purification device having a series of electrolytic cells having anode/cathode pairs formed from copper/aluminum, zinc/copper, and carbon/zinc, respectively.

5. The method according to claim 4, wherein the method further comprises selecting an electrolytic purification device having a series of electrolytic cells having anode/cathode pairs formed aluminum/aluminum, copper/aluminum, zinc/copper, and carbon/zinc, respectively.

6. The method according to claim 1, wherein the electrolytic purification device comprises five types of electrolytic cells, and wherein the anode/cathode pairs in the electrolytic cells are iron/iron, aluminum/aluminum, copper/aluminum, zinc/copper, and graphite/zinc, respectively.

7. A method for purifying water comprising:
   selecting a purification device, the device having a plurality of electrolytic cells, each electrolytic cell having an anode and a cathode and each electrolytic cell being electrically isolated from the other cells and being configured for a liquid to flow sequentially through the cells;
   selecting an anode and cathode for each of the plurality of electrolytic cells such that the anode/cathode pair of a first electrolytic cell are different than the anode/cathode pair of a second electrolytic cell in the purification device, and such that the first electrolytic cell comprises an anode made of a first metal and the second electrolytic cell comprises a cathode made of the first metal and an anode made of carbon;

connecting the anodes and cathodes of the electrolytic cells to a low voltage direct current power supply; and causing water to flow sequentially through the electrolytic cells such that ions of the first metal are deposited in the first electrolytic cell to remove impurities and such that excess ions of the first metal are removed in the second cell and carbon dioxide is deposited in the second cell to aid in the purification of the water and to decrease the pH of the water.

8. The method according to claim 7, wherein the method comprises selecting three electrolytic cells connected in series, and wherein the first electrolytic cell has a anode formed of a first metal, the second electrolytic cell has an anode formed of a second metal and a cathode formed of a second metal, and the third electrolytic cell has a carbon anode and a cathode formed of the second metal.

9. The method according to claim 7, wherein the method comprises selecting at least three electrolytic cells connected in series and which have anode/cathode pairs formed from copper/aluminum, zinc/copper, and carbon/zinc, respectively.

10. The method according to claim 7, wherein the method further comprises selecting at least one electrolytic cell which further comprises an electrostatic field capable of ionizing non-ionic compounds to thereby facilitate precipitation of the compounds.

11. The method according to claim 7, wherein the method comprises selecting at least five electrolytic cells connected in series and which have anode/cathode pairs formed from iron/iron, aluminum/aluminum, copper/aluminum, zinc/copper, and carbon/zinc, respectively.

12. A method of purifying water comprising:
selecting a purification device having a plurality of electrolytic cell stages, the cells being configured for water to flow sequentially through the cell stages;
causing water to flow through the cell stages;
causing iron cations to be deposited in the water in at least one first stage cell;
removing iron cations from the water and depositing aluminum cations into the water in at least one second stage cell;
removing aluminum cations from the water and depositing copper cations into the water in at least one third stage cell;
removing copper cations from the water and depositing zinc cations into the water in at least one fourth stage cell; and
removing zinc cations from the water and depositing carbon dioxide into the water in at least one fifth stage cell.

13. The method according to claim 12, wherein the method further comprises ionizing non-ionic molecules which are in the water, the molecules being ionized by at least one electrostatic field disposed in at least one of the electrolytic cells so as to concurrently subject the molecules to the electrostatic field and to electrolysis.

14. The method according to claim 12, wherein the method further comprises collecting hydrogen gas which is produced in the electrolytic cells.

15. The method according to claim 12, wherein the method further comprises collecting hydrogen gas produced by the electrolytic cells and using the hydrogen gas to offset the energy requirements of the electrolytic cells.

16. The method according to claim 12, wherein the method further comprises powering the electrolytic cells with a solar cell array.

17. An electrolytic water purification device comprising:
a plurality of electrolytic cell stages, each cell stage having at least one electrolytic cell, wherein each cell stage has an anode/cathode pair which is different than at least one other cell stage, and wherein the cell stages are connected such that water flows sequentially through the stages; and
wherein a final sequential electrolytic cell stage includes a carbon anode so as to deposit carbon dioxide into the water to aid in the purification of the water and to decrease the pH of the water.

18. The device of claim 17 wherein at least one electrolytic cell stage further comprises an electrostatic field of sufficient strength to ionize or otherwise break down non-ionic compounds disposed in each of the at least one electrolytic cell.

19. The device of claim 18, wherein the electrostatic field is generated with a voltage of between about 5,000 volts to about 50,000 volts.

20. The device of claim 18, wherein the electrostatic field is generated by a tube shaped member, and wherein the tube shaped member is electrically isolated from the water.

21. The device of claim 17 wherein the device comprises a series of electrolytic cells having anode/cathode pairs formed from copper/metal, zinc/copper, and carbon/zinc, respectively.

22. The device of claim 21, wherein the space between the anode and cathode is largely unobstructed.

23. The device of claim 17 wherein at least one of the electrolytic cells comprises an anode, a cathode, and an electrostatic field generator, and wherein one of the anode and cathode is a generally rod shaped member and wherein the other of the anode and cathode is a generally tube shaped member disposed around the generally rod shaped member, and wherein the electrostatic field generator is a generally tube shaped member which is larger than the generally tube shaped anode or cathode and which is disposed around the generally tube shaped anode or cathode.

24. The device of claim 17, further comprising a collector configured for collecting hydrogen gas produced by the electrolytic cells.

25. The device of claim 24, further comprising a fuel cell configured for producing electricity from the hydrogen gas.

26. The device of claim 17, wherein the device is powered by at least one of a solar array and a battery.

27. The device according to claim 17 further comprising five stages, and wherein the first stage has an iron anode and iron cathode, the second stage has an aluminum anode and aluminum cathode, the third stage has a copper anode and aluminum cathode, the fourth stage has a zinc anode and copper cathode, and the fifth stage has a graphite anode and zinc cathode.

28. An electrolytic cell comprising a generally rod shaped anode, a generally tube shaped cathode having an inner diameter larger than the diameter of the anode and being disposed around the cathode, and further comprising a generally tube shaped electrostatic field member which is larger in diameter than the generally tube shaped cathode and which is disposed around the cathode, the electrostatic field member generating a sufficiently strong electromagnetic field to ionize or otherwise break down non-ionic compounds, and wherein the space between the anode and cathode is largely unobstructed, such that molecules within the electrolytic cell are simultaneously subjected to both electrolysis and to the strong electromagnetic field.

29. A system for purifying water comprising:
a plurality of electrolytic cells, the plurality of electrolytic cells being connected in series such that water flows sequentially through the electrolytic cells, the plurality of electrolytic cells comprising:
a first electrolytic cell having a first anode and a first cathode, the first cell being configured to electrolytically deposit ions of a first metal into the water;
a second electrolytic cell having a second anode and a second cathode, the second cell being configured to electrolytically remove ions of the first metal from the water and electrolytically deposit ions of a second metal into the water; and
a third electrolytic cell having a third anode and a third cathode, the third cell being configured to electrolytically remove ions of the second metal from the water and electrolytically deposit carbon dioxide into the water.

30. The system of claim 29, wherein the system comprises electrolytic cells connected in series, and wherein the anode/cathode pairs of the electrolytic cells are iron/iron, aluminum/aluminum, copper/aluminum, zinc/copper, and graphite/zinc, respectively.

31. The system of claim 29, wherein at least one of the plurality of electrolytic cells further comprises an electrostatic field energized to between 5,000 and 50,000 volts and capable of ionizing non-ionic molecules present in the water.

* * * * *

UNITED STATES PATENT AND TRADEMARK OFFICE
CERTIFICATE OF CORRECTION

| | | |
|---|---|---|
| PATENT NO. | : 7,374,655 B2 | |
| APPLICATION NO. | : 11/032673 | |
| DATED | : May 20, 2008 | |
| INVENTOR(S) | : Gary D. Roberts and David W. Roberts | |

It is certified that error appears in the above-identified patent and that said Letters Patent is hereby corrected as shown below:

Column 1:
  Line 64, it reads "Water temperature, and…"; should read --water temperature, and…--

Column 3:
  Line 30, it reads "many of the afore mentioned…"; should read --many of the aforementioned…--
  Line 40, it reads "costly filters and membranes"; should read --costly filters and membranes.--

Column 8:
  Line 5, it reads "It is, yet further…"; should read --It is yet further…--

Column 9:
  Line 23, it reads "…bonding of a water molecule water molecule, at an atomic …"; should read --bonding of a water molecule, at an atomic…--

Column 26:
  Line 12, it reads "…a metal cylinder 224 has bene"; should read --…a metal cylinder 224 has been…--

Column 36:
  Line 26, it reads "Accordingly, equations (italicized)…"; should read --Accordingly, equations (not italicized)…--

UNITED STATES PATENT AND TRADEMARK OFFICE
CERTIFICATE OF CORRECTION

PATENT NO. : 7,374,655 B2
APPLICATION NO. : 11/032673
DATED : May 20, 2008
INVENTOR(S) : Gary D. Roberts and David W. Roberts It is certified that error appears in the above-identified patent and that said Letters Patent is hereby corrected as shown below:

Column 44:
  Line 36, it reads "...depositing metal ions"; should read --...depositing copper metal ions--

Signed and Sealed this

Twenty-fourth Day of February, 2009

JOHN DOLL
*Acting Director of the United States Patent and Trademark Office*